US007226264B2

(12) United States Patent
Eggleston et al.

(10) Patent No.: US 7,226,264 B2
(45) Date of Patent: Jun. 5, 2007

(54) SEAT GANTRY

(75) Inventors: N. Charles Eggleston, Granite Falls, WA (US); Karl J. Schaefer, Everett, WA (US); David C. Smith, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 435 days.

(21) Appl. No.: 10/654,141

(22) Filed: Sep. 3, 2003

(65) Prior Publication Data

US 2005/0047901 A1 Mar. 3, 2005

(51) Int. Cl.
*B65G 67/02* (2006.01)

(52) U.S. Cl. ...................................... 414/334

(58) Field of Classification Search ............... 414/444, 414/445, 334; 244/137.1; 294/67.2, 67.3, 294/82.26
See application file for complete search history.

(56) References Cited

U.S. PATENT DOCUMENTS

| 2,977,079 | A | * | 3/1961 | Calandra ................ 244/122 R |
| 2,998,948 | A | * | 9/1961 | Sisk ...................... 244/137.1 |
| 3,520,502 | A | * | 7/1970 | Smethers, Jr. ........... 244/137.1 |
| 3,784,028 | A | * | 1/1974 | Stewart ...................... 212/326 |
| 4,626,012 | A | * | 12/1986 | Weldele ..................... 294/81.3 |
| 4,936,527 | A | * | 6/1990 | Gorges ..................... 244/118.6 |
| 5,525,026 | A | * | 6/1996 | DeMonte et al. ........... 414/542 |
| 5,927,649 | A | * | 7/1999 | Nykiforuk ............... 244/118.1 |
| 6,193,086 | B1 | * | 2/2001 | Gunnlaugsson et al. .... 212/290 |
| 6,837,656 | B2 | * | 1/2005 | Prusinowski et al. ......... 410/30 |

* cited by examiner

*Primary Examiner*—Charles A. Fox
(74) *Attorney, Agent, or Firm*—Alston & Bird LLP

(57) ABSTRACT

A seat gantry system and method are provided for handling, installing, and removing heavy seat assemblies, and the components thereof prevent manual lifting of a heavy seat assembly during installation. A seat gantry system or method may include an outside seat gantry, a seat cart, an inside seat gantry, and an artificial lifting torso. An outside seat gantry is used for lifting a seat assembly off a shipping platform, moving and positioning a seat assembly over a seat cart, and lowering the seat assembly onto the seat cart. A seat cart is used for transporting a seat assembly. An inside seat gantry is used for lifting a seat assembly from a seat cart and positioning and lowering the seat assembly for installation. An artificial lifting torso is used to provide a common lifting point at a balanced fore-aft center of gravity of a seat assembly.

14 Claims, 14 Drawing Sheets

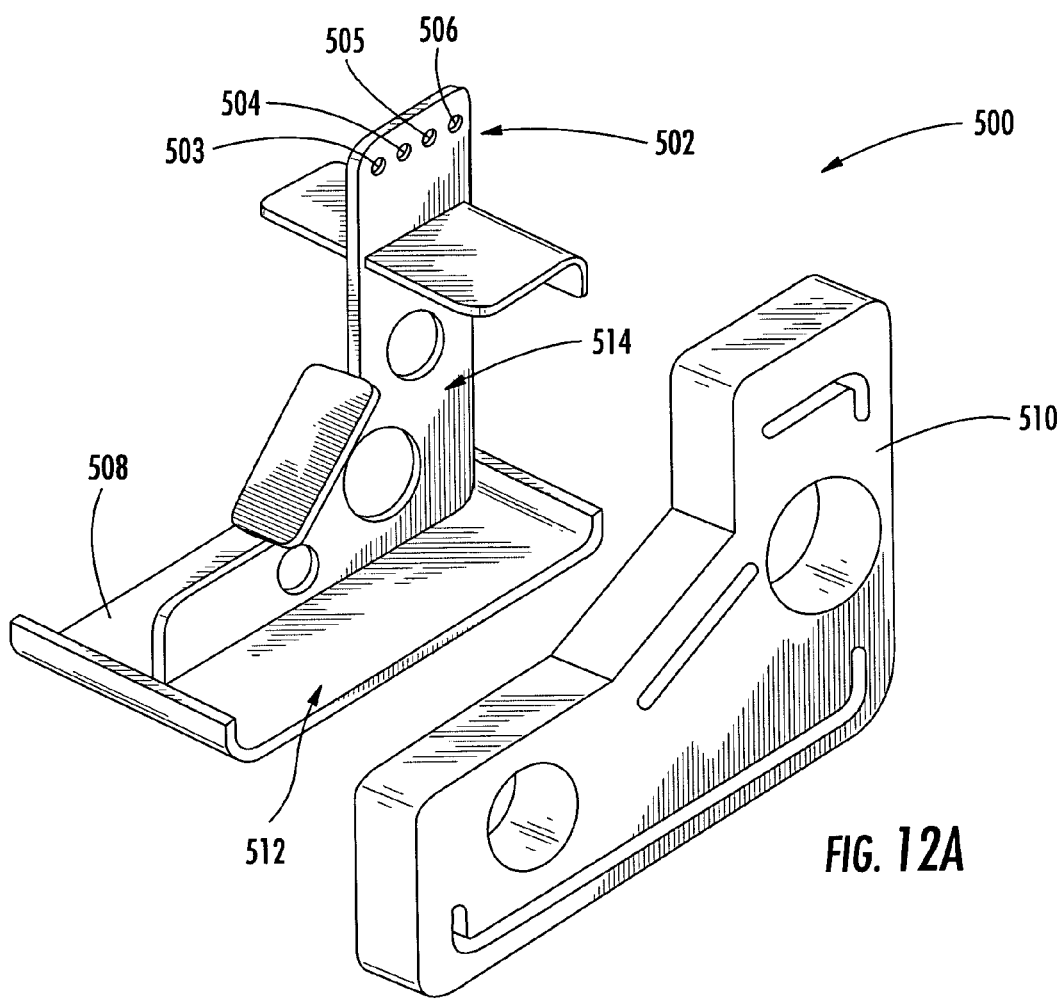
FIG. 12A
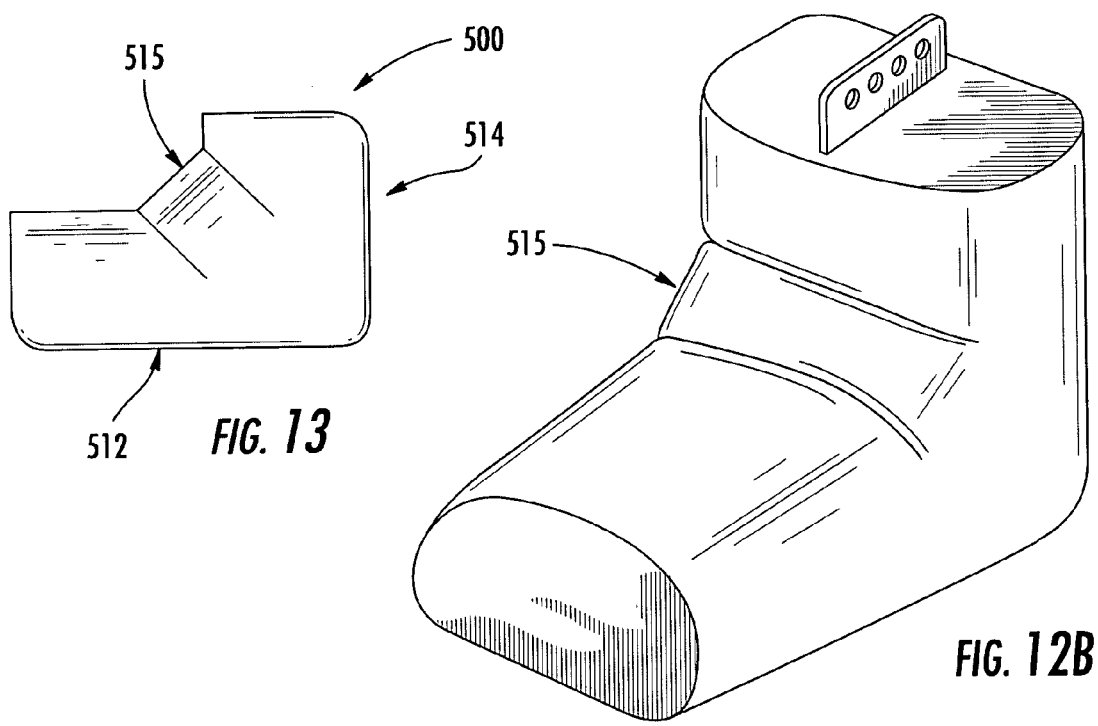
FIG. 13
FIG. 12B

SEAT GANTRY

FIELD OF THE INVENTION

The present invention relates generally to handling of passenger seats, and, more particularly, to and installation and removal of heavy aircraft seating.

BACKGROUND OF THE INVENTION

Passenger transportation seats, such as airline seats and train seats, are continually becoming more complex, and consequently heavier, particularly in the higher class seating areas such as First and Business Class accommodations. Seats now include such additional amenities as entertainment systems, Internet access, and long-range sleeper or signature features. Some of these seat assemblies including multiple seats may weigh over 500 pounds.

As the weights of seat assemblies increase, traditional methods of handling and installing seats have become cumbersome, more difficult, and a physical risk to the operators. Additionally, in confined spaces, such as airline cabins, handling and installing these heavy seats are complicated by restrictions on operator movement. Traditional methods of manual seat handling and installation are no longer practical.

Presently a crew of as many as four operators may be required to lift and maneuver a seat assembly, usually using lifting straps to improve lifting posture. However, even with lifting straps, it is impractical to manually lift these heavy seats. At every stage in a traditional process, lifting the seat assembly can be a difficultly to these operators' ability to install the seats. When seats arrive on shipping foundations, such as pallets, platforms, skids, and skates, manual lifting is required to remove the seats from the shipping foundations, transport the seats into a passenger cabin, possibly with the use of a seat cart, and lift the seats onto the vehicle floor for installation. During the process, operators have to hold a seat up while another operator maneuvers a seat cart into a position below the seat assembly or removes a seat cart from below a seat assembly. Similarly, operators are required to lift and lower seat assemblies into position for installation, often in awkward positions. Carrying a large and heavy seat assembly through a narrow doorway can be exceptionally difficult, and carrying a large and heavy seat assembly over workspace obstacles even as small as a surface transition can present a dangerous potential for operator injury from tripping or stumbling while supporting at least part of the weight of a seat assembly.

The constrained spaces of an airline compartment, particularly restricted overhead spaces such as under stow bins and interior walls that rapidly slope inward at the side of a cabin, cause this process to be even more difficult, especially for heavier seat assemblies. As shown in FIG. 1, up to 74 inches of vertical working space may be available in the center of the aircraft, under the center stow bins, but as little as 64 inches or less may be available under the outboard stow bins, on the seat assembly centerline. Of this space, most is consumed by seats with seat backs often being 44 inches or taller as installed. The back of a seat loaded on a seat cart for transportation may be 53 inches or more off the floor given the height of the seat cart deck. Because of stow bins and cabin accessories, there may be as little as 10 inches of vertical space remaining to lift a seat assembly on or off a seat cart and to properly position the seat assembly. The additional and improved amenities for First and Business Class accommodations such as entertainment systems and Internet access that are attached to the seat frames below the seats may prevent operators from lifting these seats from the bottom.

Therefore, with increasing weights and complexities of passenger transportation seat assemblies, a system and method to easily handle, install, and remove seat assemblies is needed. The ability for a single operator or limited number of operators to lift and remove a seat for inspection or modification is particularly useful now that ever more complicated electronics packages are being incorporated into seats along with supporting cables through and along the aircraft floor, all of which may require that seats be lifted for access prior to removal for repair or upgrades.

BRIEF SUMMARY OF THE INVENTION

A system and method for handling, installing, and removing passenger transportation seats and seat assemblies and components thereof are therefore provided. A single operator or two operators may easily handle a large and heavy seat assembly using a seat gantry system of the present invention, reducing a traditional crew of operators and reducing the physical requirements of a seat handling operator. The system and components thereof are used to perform or assist in handling of seat assemblies and are designed with features to assist in use with seat assemblies, such as being able to easily negotiate airplane aisles, currently as little as 15 inches wide. The system and components thereof are also designed to easily remove a seat cart from a shipping foundation, transport the seat assembly onto the airplane, and lower the seat assembly into position for installation.

A seat gantry system and components thereof eliminate the need for any manual lifting of a seat assembly, also referred to in this application generally as a seat, seat unit, or seat group and where a seat assembly, unit, or group may include multiple seats. A hoist attached to a frame of a seat gantry of one embodiment of the present invention provides the upward and downward forces of lifting a seat assembly. This eliminates much of the ergonomic risk associated with manual handling, transporting, and installing of seat assemblies as well as the potential for physical damage to the seat assemblies and vehicle interior.

A seat gantry system and method for handling seat assemblies and the components thereof, handling units and other lifting devices, are provided. A seat gantry system or method may include an outside seat gantry, a seat cart, an inside seat gantry, and an artificial lifting torso. An outside seat gantry may be used for lifting a seat or seat assembly off of shipping materials or platform, moving and positioning a seat assembly over a seat cart, and lowering the seat or seat assembly onto a seat cart. An outside seat gantry is advantageously included in part due to the problems and difficulties of lifting a seat or seat assembly from a shipping foundation and the problems and difficulties of properly positioning and lowering a seat or seat assembly onto a seat cart.

A seat cart may be used for transporting a seat assembly. A seat cart is particularly useful when navigating a large, and potentially heavy, seat assembly through a narrow doorway such as into an aircraft cabin and over small obstacles that present a danger of tripping for an operator carrying a seat assembly.

An inside seat gantry may be used for lifting a seat assembly from a seat cart and positioning and lowering the seat assembly for installation once the seat cart has been removed. An inside seat gantry is advantageously included in part due to the problems and difficulties of lifting a seat or seat assembly from a seat cart and the problems and difficulties of properly positioning, lowering, and installing a seat or seat assembly into a vehicle floor. To remove a seat assembly from a seat cart, the seat assembly must be lifted high enough to clear the seat cart from below the seat assembly. A properly designed inside seat gantry may be used in place of a separate outside seat gantry; features beneficial for use of an inside seat gantry in place of an outside seat gantry include the ability to increase the overall height for greater freedom of operation involving various heights of shipping foundations and an increased wheel base for greater stability, allowing for safe movement of a seat assembly while suspended from such a seat gantry.

A seat gantry system or method may also include an artificial lifting torso for use with an outside seat gantry or an inside seat gantry. An artificial lifting torso may be used to prevent lifting seats by the seatbelts that are not configured to approximately balance the fore-aft center of gravity of the seat assembly. An artificial lifting torso is one example of a seat engagement mechanism to allow a seat gantry the ability to connect to and lift a seat assembly. Another example of a seat engagement mechanism is a seat belt affixed to the seat assembly that can be used by a seat gantry to lift the seat assembly. Lifting a seat assembly using a seat gantry is facilitated using two seat engagement mechanisms, an artificial lifting torso and a seat belt securing the artificial lifting torso to the seat assembly.

The system may also utilize load balance beams and other support and lifting devices for use with an outside seat gantry or inside seat gantry. The combination of an artificial lifting torso and a load balance beam provides fore-aft and side-to-side center of gravity balancing.

An outside seat gantry of one embodiment of the present invention has an overhead frame corresponding to the sizes of different seat assemblies. The overhead frame is high enough from the floor to lift a seat assembly from an elevated position on a seat cart and wide enough to accommodate different sizes of seat assemblies. The overhead frame is also sized such that it may straddle a shipping platform in order to lift and remove a seat assembly from the shipping platform. At the bottom of the overhead frame are casters that allow for easy movement of the outside seat gantry in any direction. A hoist is mounted to the overhead frame for lifting seats and seat assemblies. The width of an outside seat gantry of one embodiment of the present invention may be changed using adjustable-length cross members in the horizontal portion of the overhead frame.

An inside seat gantry of one embodiment of the present invention has a frame that is sized to accommodate seat back heights and seat widths of different seat assemblies. Casters may be affixed to the bottom of an inside seat gantry frame for easy movement in all directions. A hoist is mounted to the frame of an inside seat gantry. Leg sections of an inside seat gantry frame of one embodiment of the present invention may be adjusted for variable heights to accommodate situations where a seat must be installed or removed from a position with limited overhead space. The legs of an inside seat gantry may include upstanding portions and upper portions. These portions may be connected at a curved transition or may intersect at an angle. The width between the legs of an inside seat gantry of one embodiment of the present invention may be varied such as by using adjustable-length cross members. Additionally, the casters affixed to the bottom of an inside seat gantry of one embodiment of the present invention may be adjusted to decrease the width of the base of an inside seat gantry to allow for transportation through a narrow aisle or the width may be increased to provide a wider base for increased stability.

The improved seat cart of one embodiment of the present invention includes a platform for supporting the weight of a seat assembly and casters on the bottom of the platform for movement of the seat assembly and negotiation of obstacles. The seat cart may include pads, or another seat leg accepting device such as a pliable material or adjustable sliding trays, affixed to the top surface of the platform upon which the legs of a seat assembly rest. Bumpers may be affixed to the sides and one end. A handle may be attached to the other end of the platform. Wheels may be mounted to the sides and at the corners of the platform, and may be used in conjunction with the handle to transport the seat cart on its edge. A seat cart of one embodiment of the present invention is designed to support a seat assembly, or seat legs, and to fit under a seat assembly lifted by an outside seat gantry or inside seat gantry.

An artificial lifting torso of one embodiment of the present invention of a seat gantry system or method includes a seat portion and a back portion. Lifting points are provided either as part of the back portion or as a separate lifting tang. These lifting points correspond to fore-aft center of gravity positions for seat assemblies. Also included in an artificial lifting torso of one embodiment of the present invention is a belt portion attached at the intersection of the seat and back portions. The belt portion is an angled surface, possibly a radial surface approximating the convex shape of a human torso to allow a seat belt of a seat assembly to secure a lifting torso and a seat of a seat assembly. This belt portion may be provided with a mechanical adjustment mechanism to allow easy tensioning of a seat belt of a seat assembly in addition to or supplementing the tensioning provided by the seat belt buckle apparatus. The purpose of this device is to ensure consistent tensioning of the seat belts.

A seat gantry method for handling seat assemblies of one embodiment of the present invention includes activities such as lifting a seat assembly from a shipping platform, moving and positioning a seat assembly over a seat cart, lowering a seat assembly onto the seat cart, transporting the seat assembly into position for installation, lifting the seat assembly with an inside seat gantry, positioning the seat assembly for installation, and lowering and installing the seat assembly.

BRIEF DESCRIPTION OF THE DRAWINGS

Figure 1:
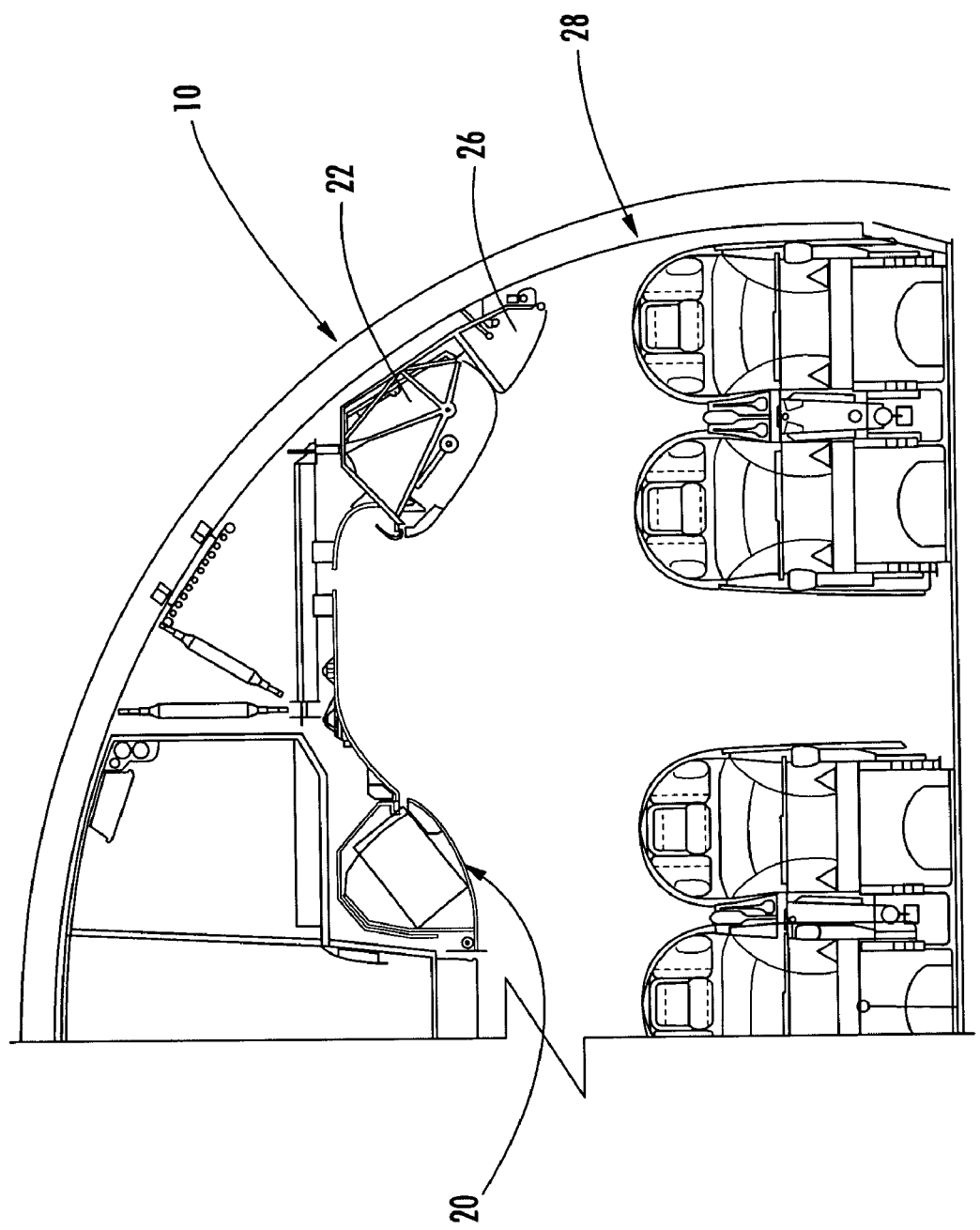
Figure 2:
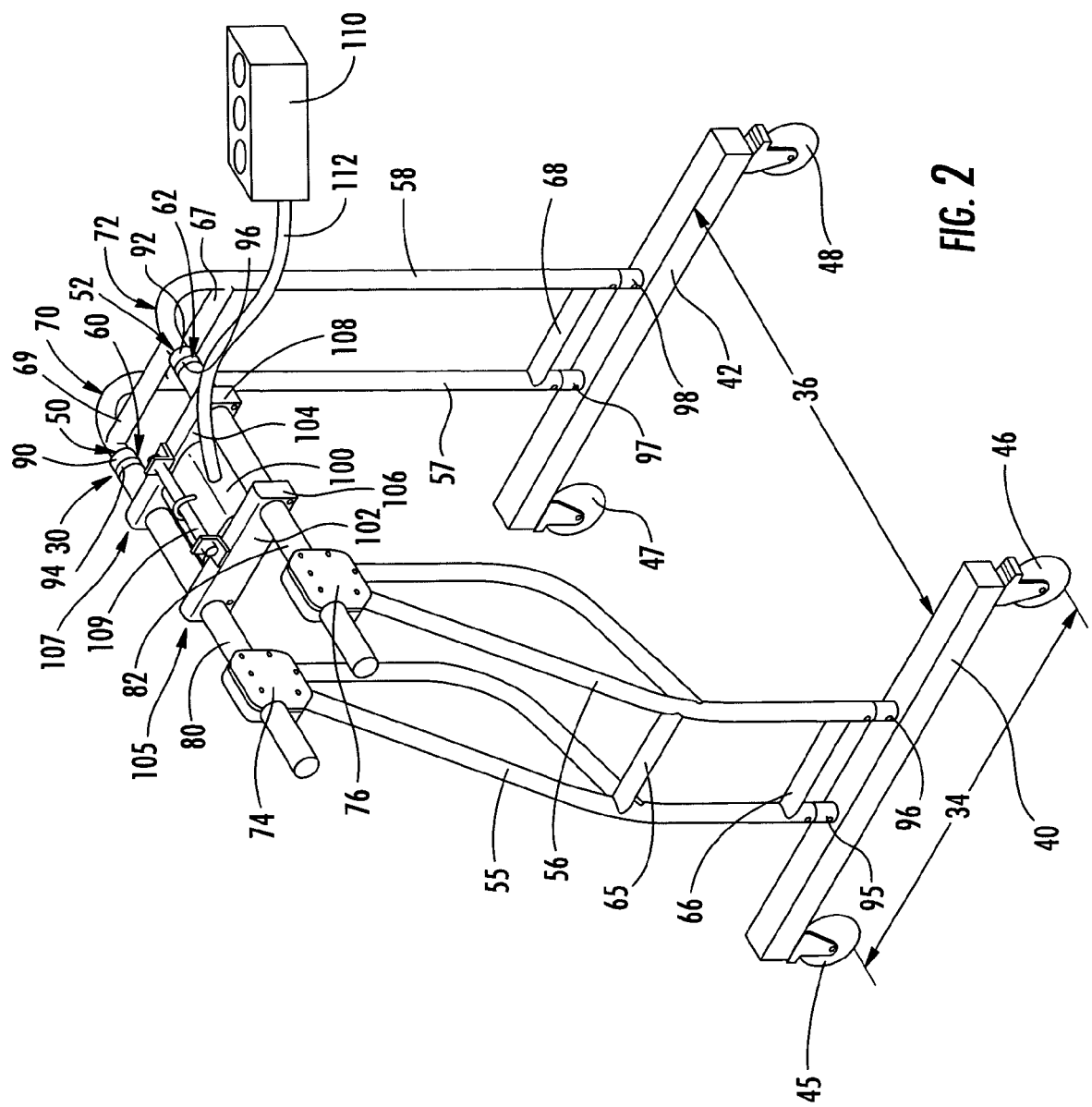
Figure 3:
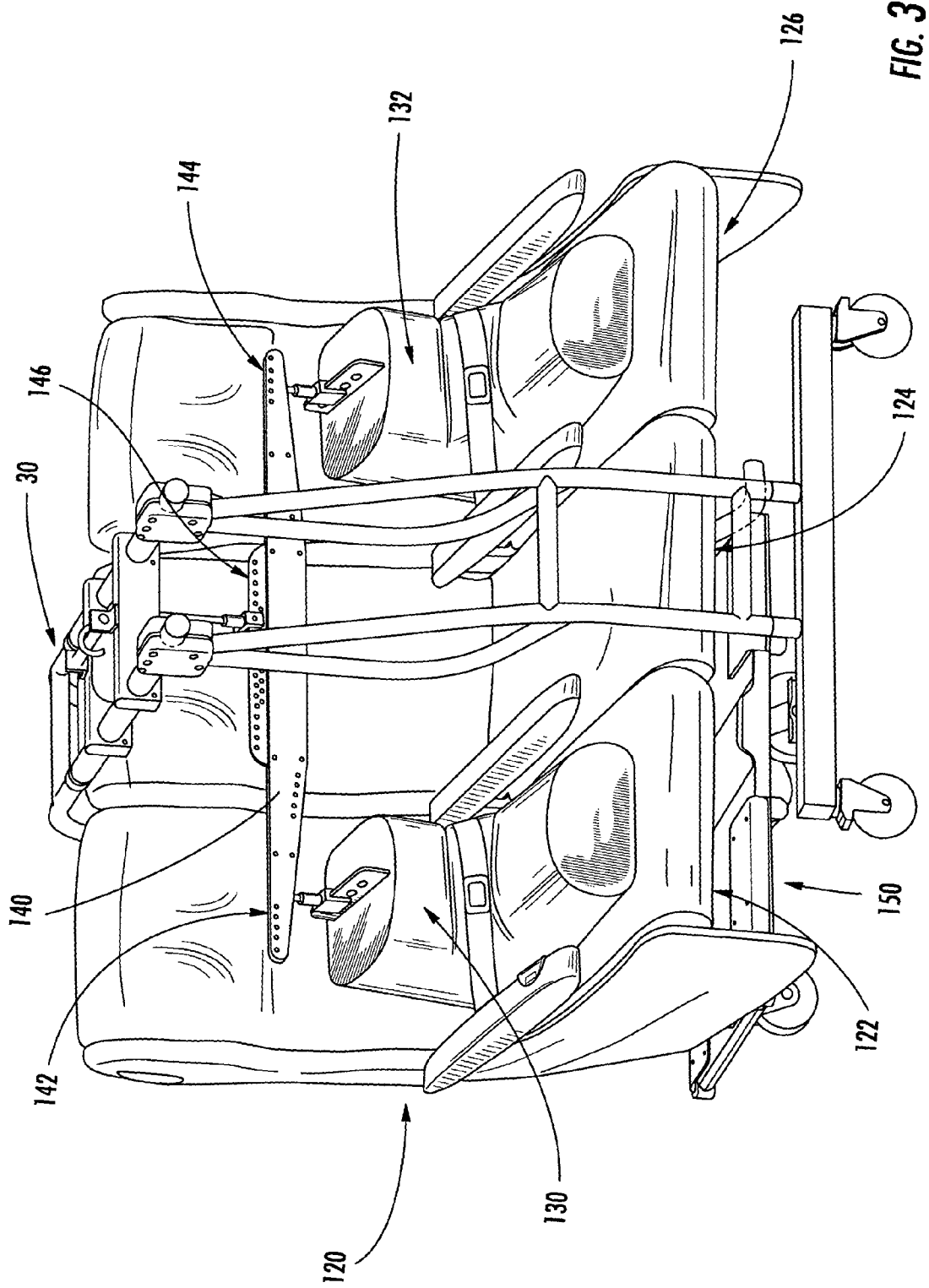
Figure 4:
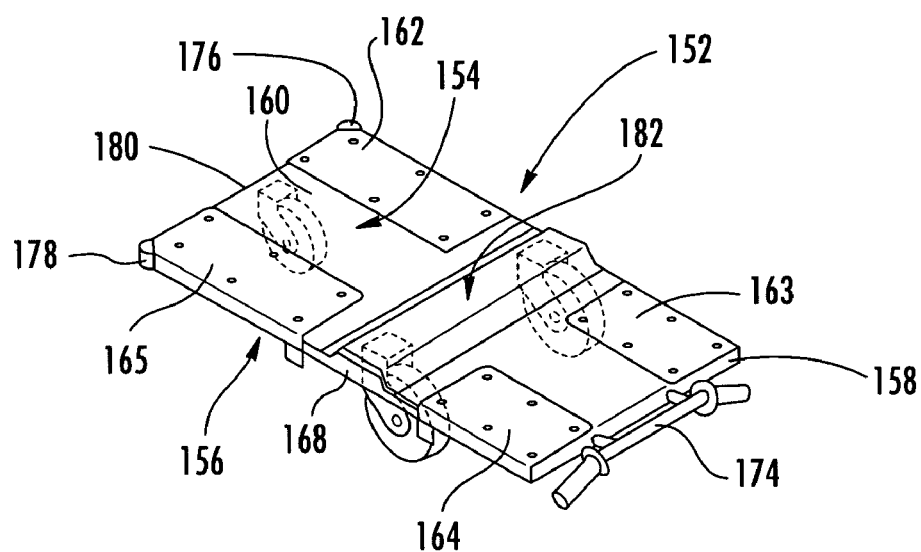
Figure 5:
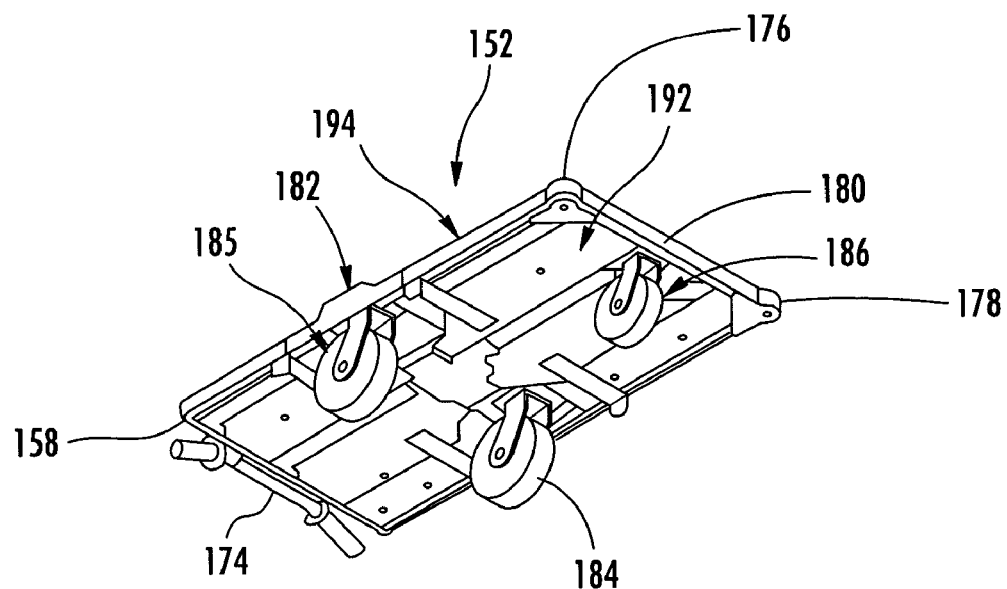
Figure 6A:
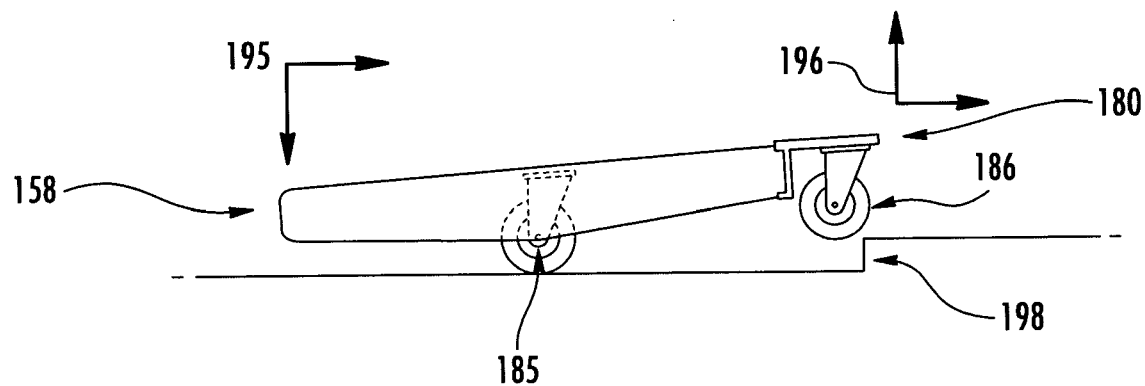
Figure 6B:
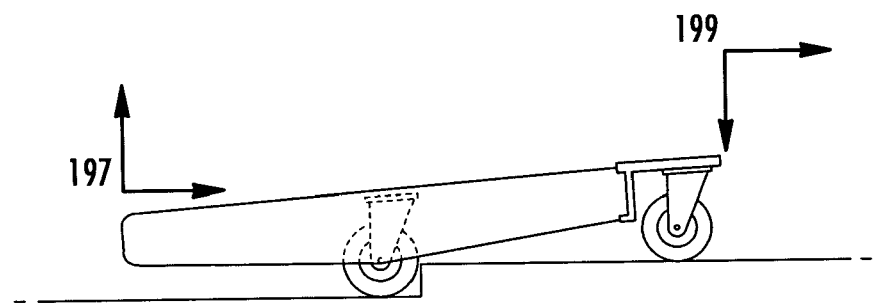
Figure 6C:
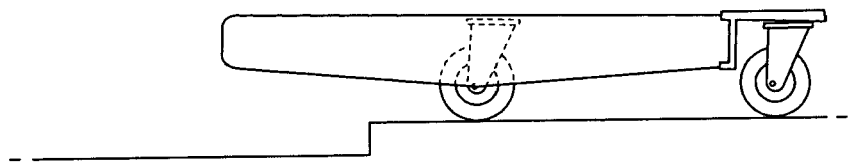
Figure 7:
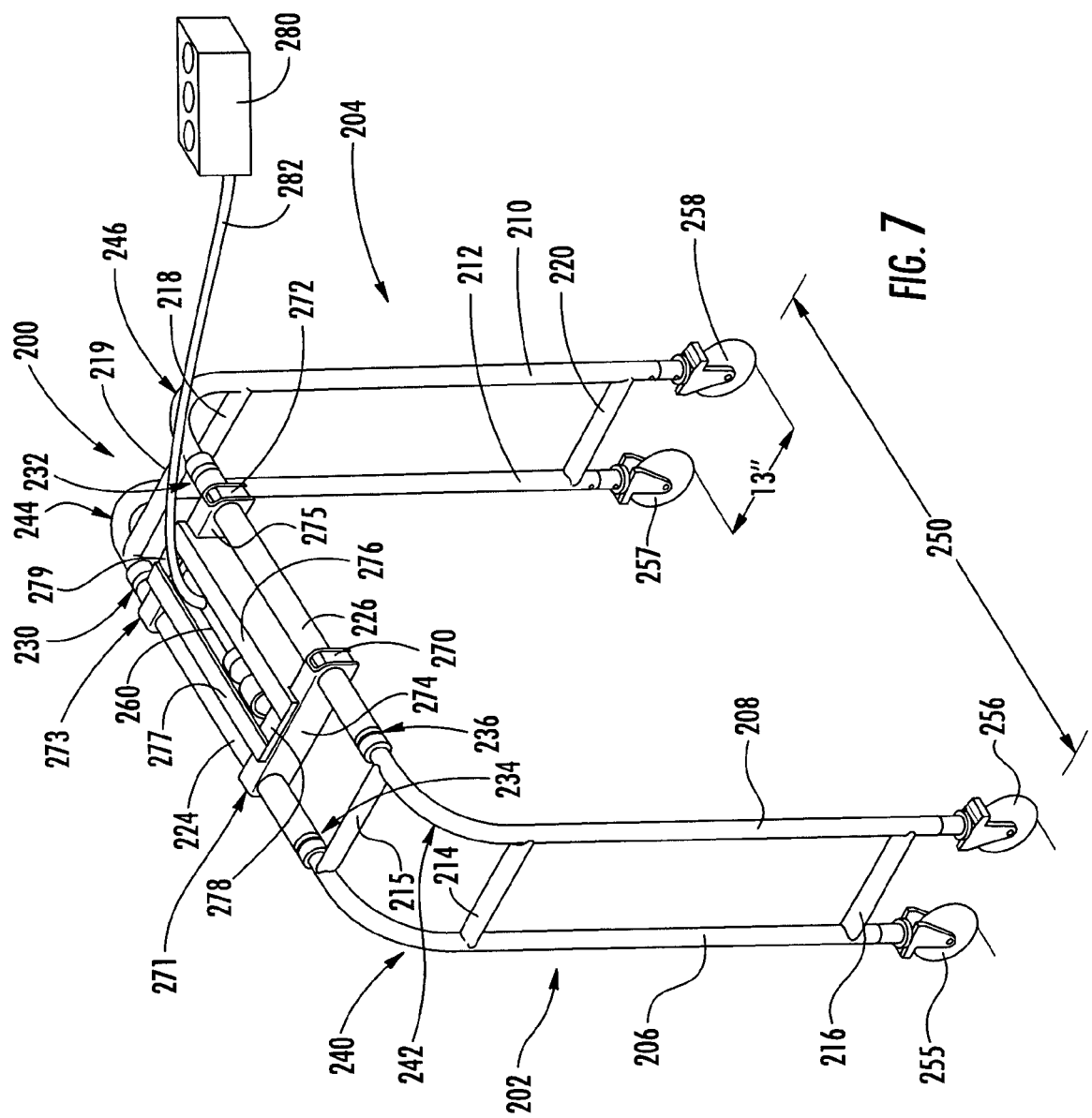
Figure 8:
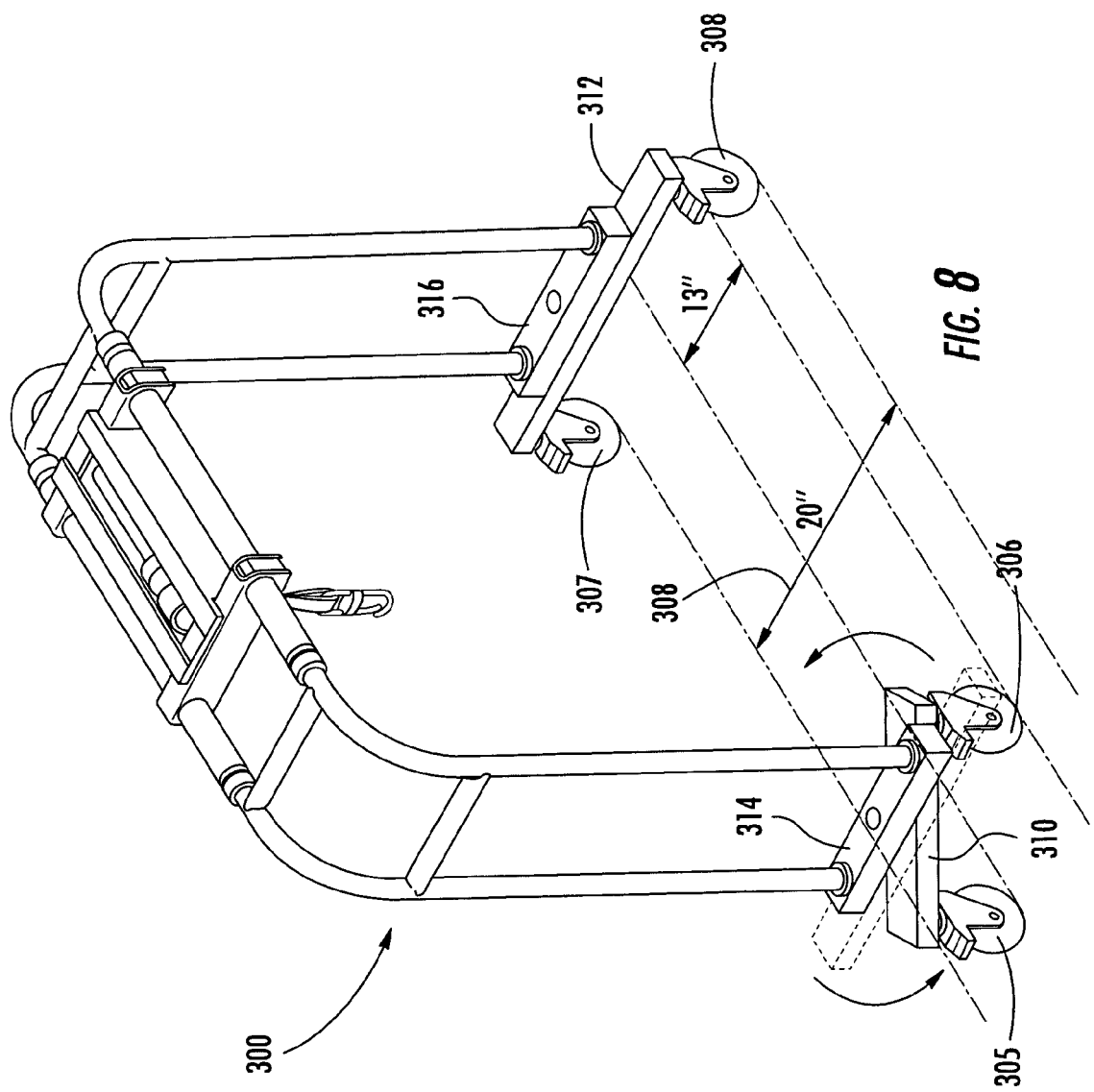
Figure 9:
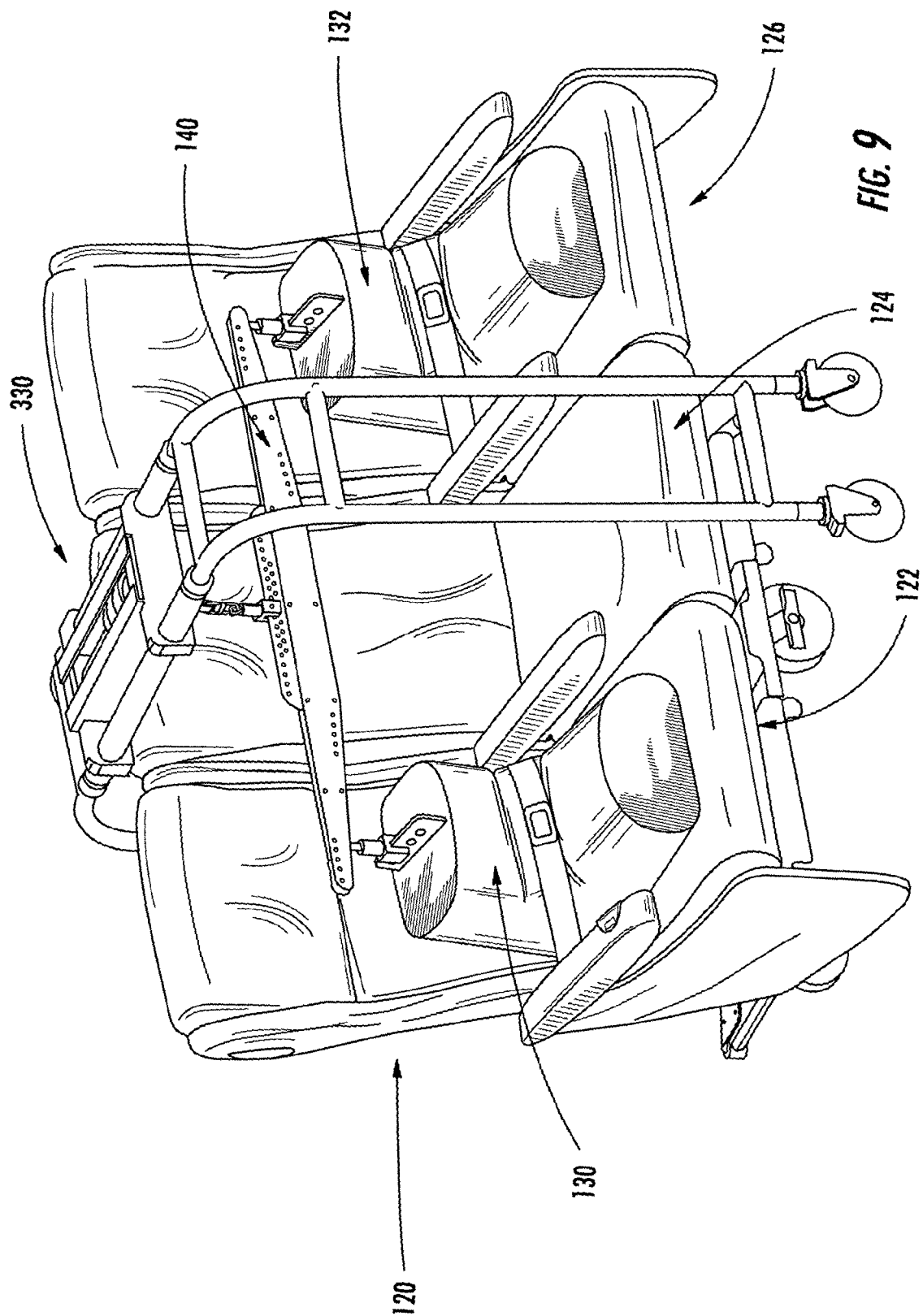
Figure 10:
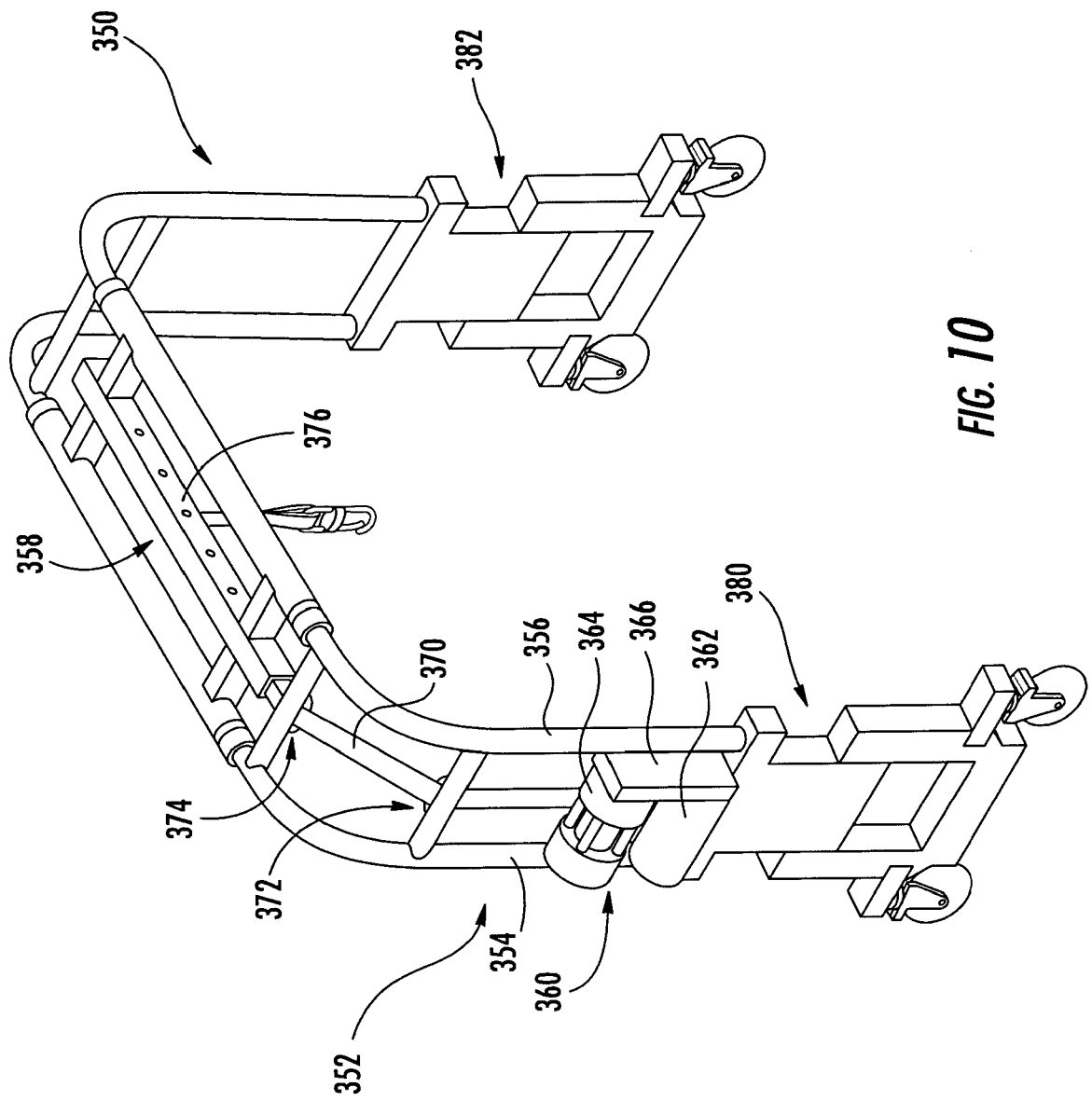
Figure 11:
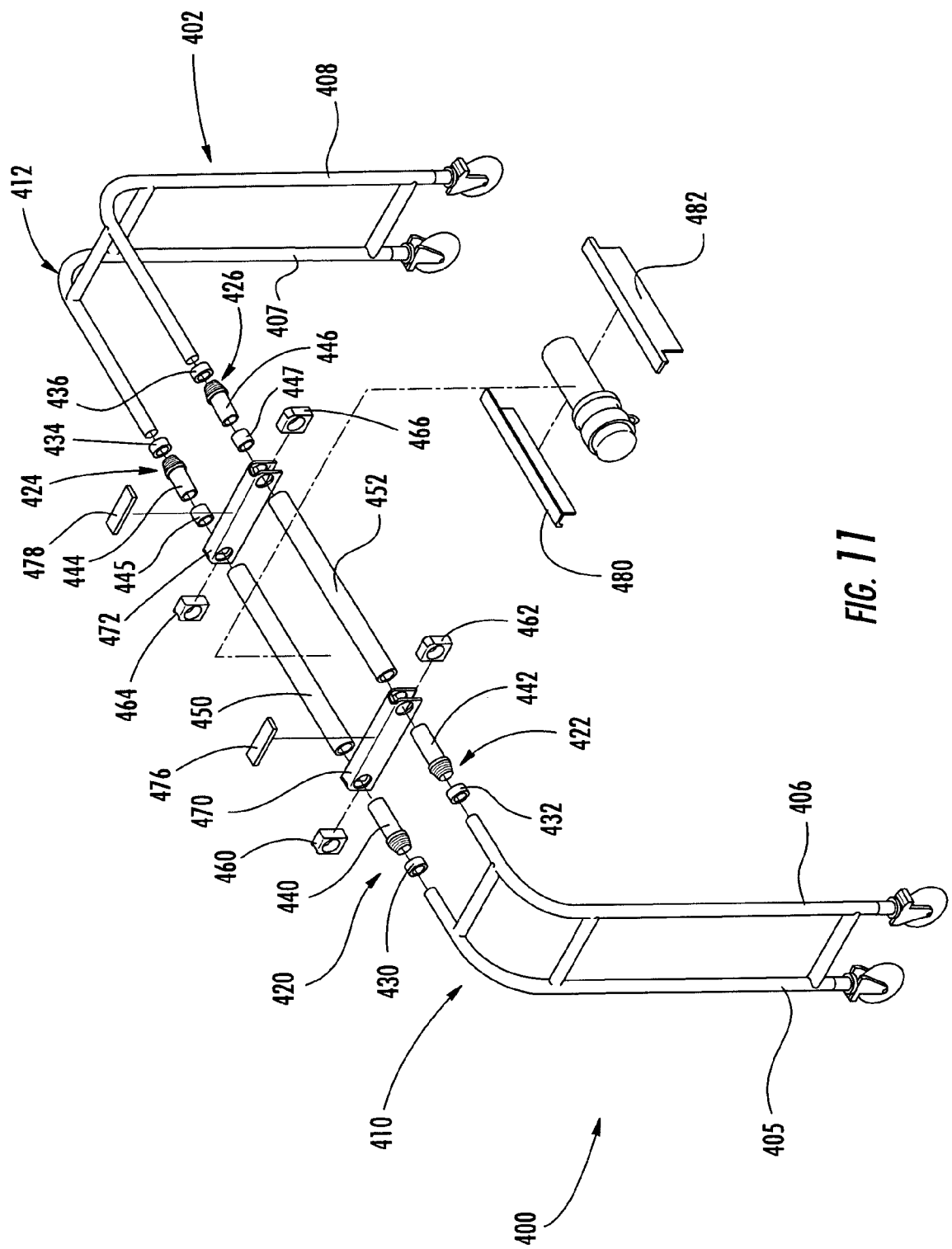
Figure 14:
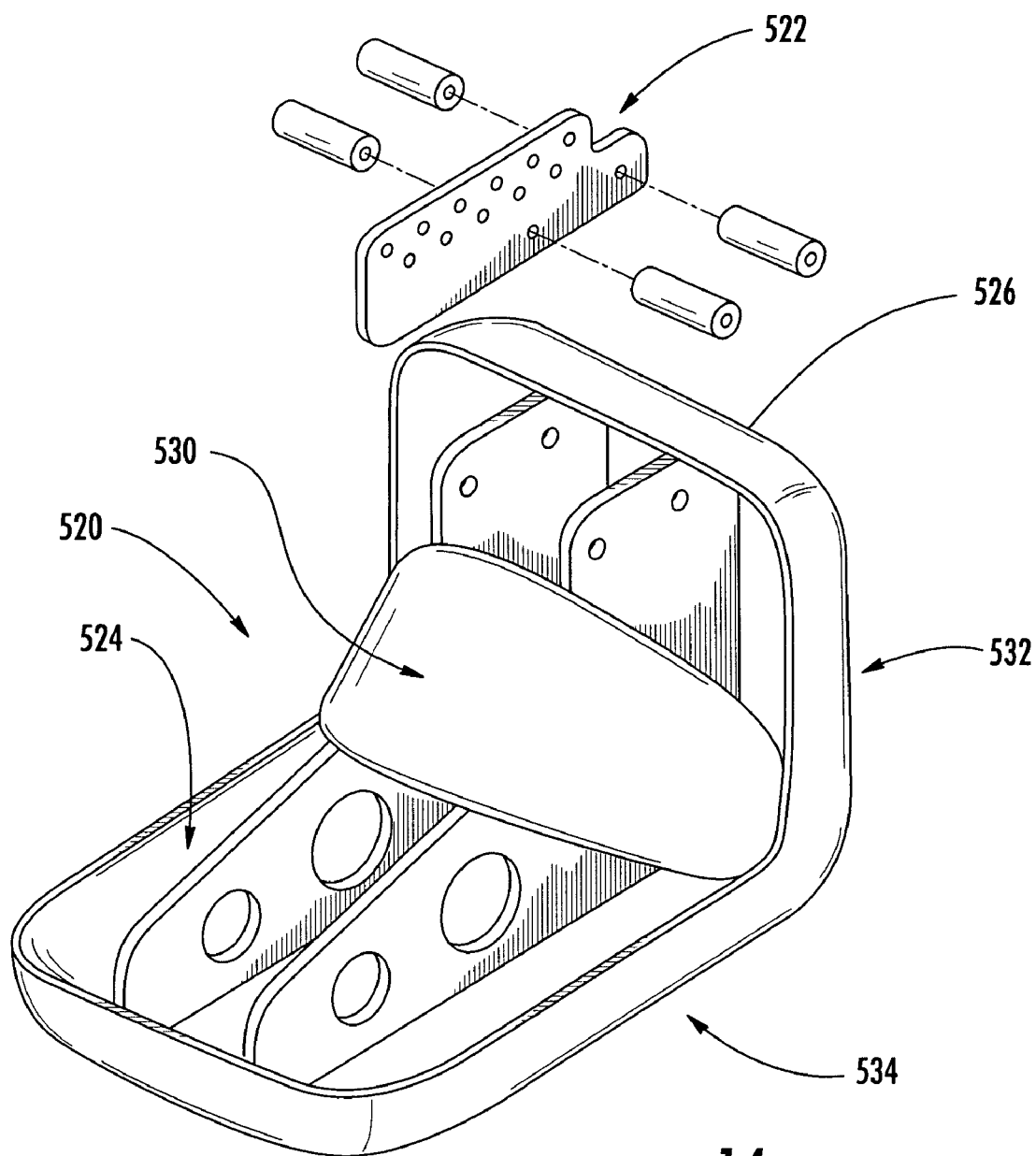
Figure 15:
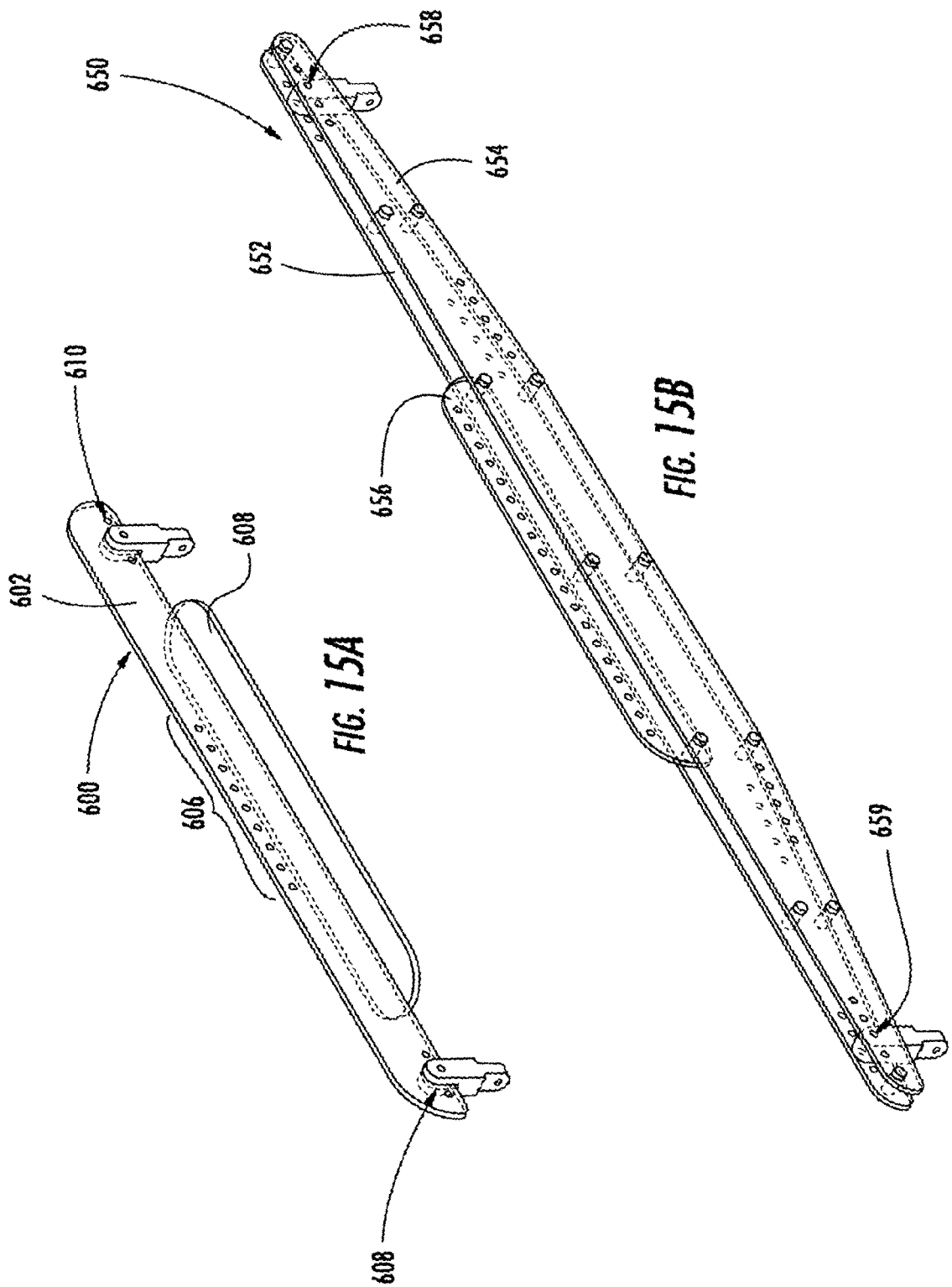
Figure 16:
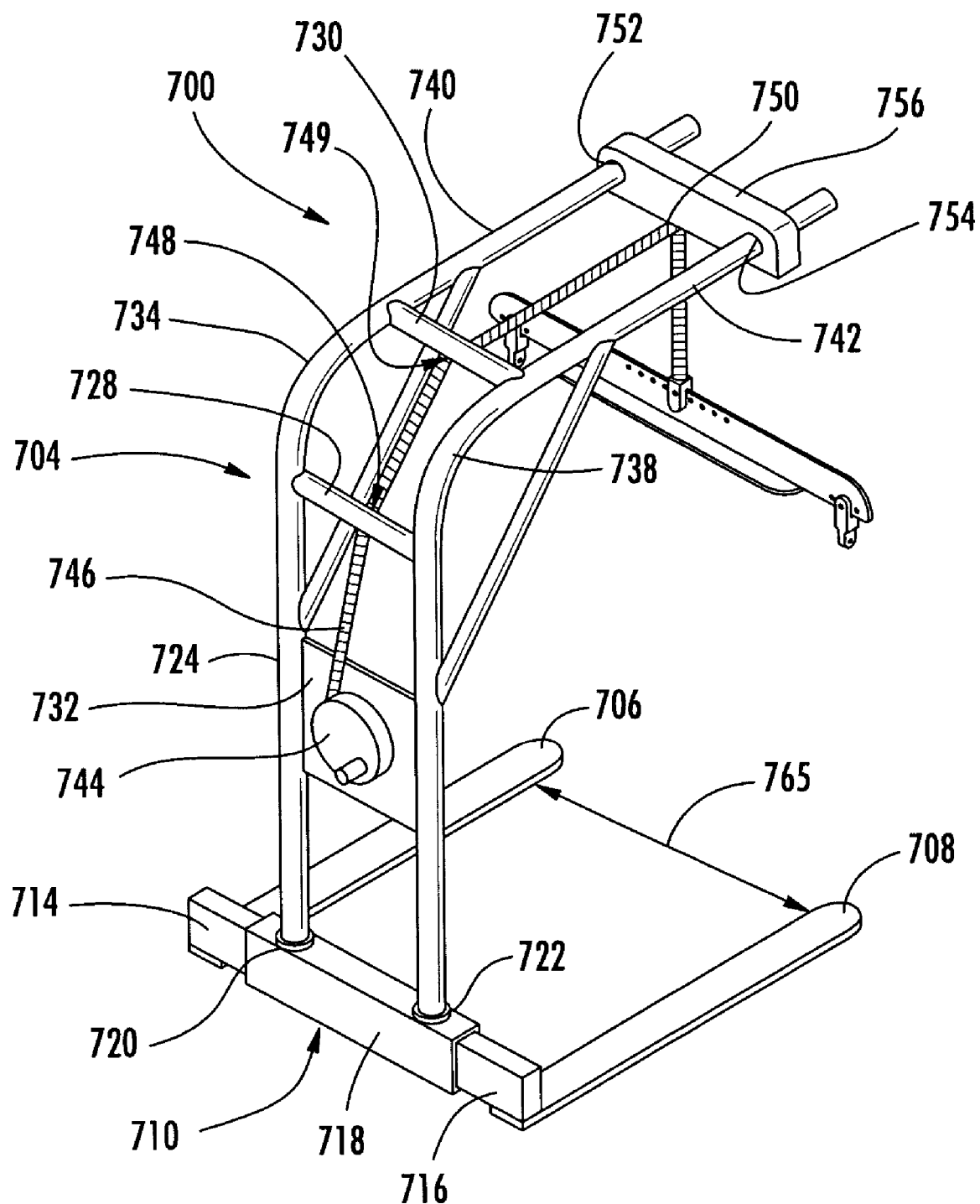

Having thus described the invention in general terms, reference will now be made to the accompanying drawings, which are not necessarily drawn to scale, and wherein:

FIG. 1 is a cross-sectional diagram of a passenger compartment of an aircraft;

FIG. 2 is a perspective view of an outside seat gantry of one embodiment of the present invention;

FIG. 3 is a perspective view of an outside seat gantry of one embodiment of the present invention lifting a seat assembly;

FIG. 4 is a perspective view of a seat cart of one embodiment of the present invention from the top, side, and end;

FIG. 5 is a perspective view of a seat cart of one embodiment of the present invention from the bottom, side, and end;

FIG. 6A is a diagram of a seat cart of one embodiment of the present invention negotiating an obstacle;

FIG. 6B is a diagram of a seat cart of one embodiment of the present invention negotiating an obstacle;

FIG. 6C is a diagram of a seat cart of one embodiment of the present invention negotiating an obstacle;

FIG. 7 is a perspective view of a first embodiment of an inside seat gantry of the present invention;

FIG. 8 is a perspective view of a second embodiment of an inside seat gantry of the present invention;

FIG. 9 is a perspective view of an inside seat gantry of one embodiment of the present invention lifting a seat assembly;

FIG. 10 is a perspective view of a third embodiment of an inside seat gantry of the present invention with adjustable leg lengths and frame height;

FIG. 11 is a schematic diagram of one embodiment of a horizontal portion of an inside seat gantry of the present invention;

FIG. 12A is an exploded, perspective view of the structure of a first embodiment of an artificial lifting torso of the present invention;

FIG. 12B is a perspective view of a first embodiment of an artificial lifting torso of the present invention;

FIG. 13 is a cross-sectional view of a first embodiment of an artificial lifting torso of the present invention;

FIG. 14 is a perspective view of a second embodiment of an artificial lifting torso of the present invention;

FIG. 15A is a schematic diagram of a first embodiment of a lifting balance beam of the present invention;

FIG. 15B is a schematic diagram of a second embodiment of a lifting balance beam of the present invention; and FIG. 16 is an embodiment of an inside seat gantry of the present invention that may be used to install seat assemblies against a bulkhead.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

While a primary use of the present invention is in the field of aircraft seat installation and removal, it will be appreciated from the following description that the invention is also useful for many activities associated with lifting and moving heavy objects in confined spaces such as repair or modification of seats assemblies. It will also be appreciated from the following description that the invention is not restricted to aircraft seats, but may be used for other seat types and other vehicle applications such as trains and boats.

FIG. 1 shows a cross-section of a Boeing 777 aircraft 10, representative of a typical commercial airline cabin and analogous to passenger cabins in other vehicles such as trains. The overhead space of an aircraft cabin may be restricted to as little as 72 inches under the stow bins 20 in the center of the cabin. Because of low overhead stow bins 22 and accessory panels 26 along a cabin wall 28, operators installing seats may have as little as 64 inches or less in some locations to install a seat assembly along the cabin wall 28. Since seat backs usually are around 44 inches in height, little overhead space remains for operators or assembly equipment.

FIG. 2 shows a perspective diagram of an outside seat gantry 30 of one embodiment of the present invention. The outside seat gantry 30 includes an overhead frame that may be fabricated from various materials, such as aluminum or aluminum alloy tubes, sized to accommodate an expected load to be carried by the outside gantry. The construction and shape of the overhead frame is designed to accommodate different sizes and types of seat assemblies and to engage and raise those seat assemblies from a position on a shipping foundation or a seat cart.

To engage and raise a seat assembly from a shipping foundation, the wheelbase 34 and width 36 of the overhead frame may be sized to straddle shipping foundations that are used to ship seat assemblies. The wheel base 34 of the outside seat gantry 30 of an embodiment of the present invention shown in FIG. 2 includes base members 40, 42, or wheel axle bars, to accommodate casters 45, 46, 47, 48 to facilitate movement of the overhead seat gantry 30. The overhead frame may also include leg sections extending upwards from a respective base member and joined to another respective leg section at an upper portion thereof by an adjustable tubing connection 50, 52. This allows the width 36 between the leg sections 55, 56, 57, 58 to increase or decrease as necessary. By way of example, the adjustable tubing connections 50, 52 may be plastic lock and slip collet assemblies 60, 62 on the aluminum frame; although, other adjustable connections and other materials may be employed. The design and construction of the outside gantry 30 of an embodiment of the present invention shown in FIG. 2 is capable of easy scaling for larger or smaller versions. The tubing that forms the leg segments 55, 56, 57, 58 of the gantry may be tubes, typically aluminum, although other materials may be used, sized for the expected loads at about 1.625 inches in diameter (for aluminum), although other sizes may be desired for expected loads, bent to a desired configuration for an outside gantry and connected by welded cross braces 65, 66, 67, 68, 69 also typically formed of aluminum and having the same diameter as the leg segments. The upper portions 70, 72 of the leg segments 57, 58 may be bent to approximately 90 degrees to create a transition to an upper portion of the outside gantry frame or attached to the upper portion of the outside gantry frame with bracing 74, 76.

As mentioned above, the upper portion of the frame permits an adjustable width or spacing between the legs. For example, the leg tubes 57, 58 slidably engage respective cross tubes 80, 82 of the upper portion of the frame to allow an adjustable width 36 between the legs of the outside gantry frame. The adjustment between the nested tube segments may be controlled by collets 90, 92 and guide bushings 94, 96 of the collet assemblies 60, 62. However, any means of controlling the range of motion of the nested tube segments may be sufficient, including a mechanical pin design where a pin is driven through the diameter of nested tubes to select and fix the location of adjustment.

A base member 40, 42 may be an aluminum box section formed to accommodate the casters 45, 46, 47, 48 inserted at each end. However, the box member can be formed of other materials and may be tubular or have other configurations if desired. The wider the wheel base 34 between casters on each of the leg segments of an outside seat gantry, the greater the stability of the outside seat gantry. The stability of the seat gantry is a factor to consider if the gantry will be used to move a seat assembly while the seat assembly is suspended from the outside seat gantry. The leg segments 55, 56, 57, 58 of the outside seat gantry may connect at studs 95, 96, 97, 98 on the base member 40, 42. This connection may be removable in order to allow the gantry to be disassembled or for parts of the gantry to be replaced for alternate use, such as for use inside a vehicle cabin.

The casters 45, 46, 47, 48 included in the outside seat gantry 30 of one embodiment of the present invention shown in FIG. 2 include a position lock and a brake. The position lock allows the casters to be fixed for side-to-side rolling. The brake prevents unintended movement of the seat gantry, possibly during lifting and lowering of a seat assembly. The casters for an outside seat gantry may also be larger and heavier than the casters used for a separate inside seat gantry. Generally casters are wheels mounted on swivels. In this application casters and wheels refer to any type of wheel or rolling mechanism to allow a seat gantry or seat cart to move or rotate on a substantially flat surface. Included in, but not limiting, this definition for casters and wheels are traditional casters, fixed wheels, bearings, tracks, and such means as air sleds, magnetic levitation, and hydroplaning.

A hoist 100 is used with the outside seat gantry frame to lift and lower a seat assembly. The position of the hoist 100 may be adjusted along the length of the upper portion of the outside seat gantry frame. The hoist 100 may be mounted to the upper portion of an outside seat gantry frame using hoist mounting cross segments 102, 104 and bearings 105, 106, 107, 108 to allow the hoist assembly to slide along the horizontal section of the outside seat gantry frame. Typically, the cross segments are formed of aluminum and the bearings are formed of plastic, although other materials may be utilized. Thus, the hoist assembly may slide on the bearings 105, 106, 107, 108 over the tubes 80, 82. A hoist assembly parallel cross-beam or tubing 109, also typically formed of steel or aluminum may be used to mount the hoist 100, between the two hoist mounting cross segments 102, 104.

The hoist for an outside seat gantry may be a single speed, electric chain hoist. Although the speed control and precision of a variable speed hoist or a strap hoist is not required for an outside seat gantry to lift a seat assembly from a shipping foundation or lower a seat assembly onto a seat cart, a variable speed hoist or a strap hoist may be utilized if desired. However, the use of a single speed, electric chain hoist may decrease the cost of an outside seat gantry by eliminating features that may not substantially benefit the operation of an outside seat gantry. The single speed, electric chain hoist for an outside seat gantry may utilize a 120 volt alternating current (AC) power source. Such a chain hoist may be an off-the-shelf unit running at approximately 8 feet per minute. A manual hoist or a hoist powered by a source other than electricity would also function appropriately for an outside seat gantry. A manual hoist operated by a hand crank or lever capable of lifting the expected heavy loads may require a gear reduction resulting in sixty or more revolutions of a crank handle for each seat installation. A battery-powered hoist would allow the seat gantry to operate uninhibited by any restraining cables, for example, electric cords or air hoses; a hand-cranked hoist would similarly free the seat gantry of restrictive cables or cords and allow for a wider range of use of a seat gantry.

The hoist 100 may be operated from a control, such as a pendant control 110 that allows a worker to operate the hoist 100 of the outside seat gantry 30 from any position around the outside seat gantry. The flexibility of using a pendant control 110 attached to the hoist 100 by a connecting cable 112 allows a single worker or two workers to perform the functions of lifting, maneuvering, transporting, and lowering a seat assembly in such a manner as an individual controlling the hoist may also be able to physically assist in the use of the outside seat gantry while operating the hoist. The hoist 100 may alternatively be operated remotely without a physical connection, such as via wireless communications.

FIG. 3 shows a perspective view of an outside seat gantry 30 of one embodiment of the present invention lifting a seat assembly 120. The illustration shows a seat assembly 120 with three seats 122, 124, 126 in the grouping elevated by the outside seat gantry 30 after having been removed from a shipping foundation (not shown). The seat assembly 120 is supported by artificial lifting torsos 130, 132, described more fully herein with relation to FIGS. 12, 13 and 14, and a horizontal lifting balance beam 140, described more fully herein with relation to FIGS. 15A and 15B. To provide greater side-to-side stability of a large seat assembly, artificial lifting torsos 130, 132 may be attached at the outermost seats 122, 126 of a seat assembly 120 and then attached to appropriate downward lifting points 142, 144 of the balance beam 140. The balance beam 140 is then attached to the hoist 100 of the outside seat gantry 30 at an appropriate upward lifting point 146. As seen in FIG. 3, a seat assembly 120 is lifted high enough by an outside seat gantry 30 to allow for a seat cart 150 to be placed into position below the elevated seat assembly 120. While the outside seat gantry can remove a seat assembly from a shipping foundation or the like, the seat assembly may then be placed on a seat cart for transport to and within the aircraft or other vehicle.

FIG. 4 is a perspective view of a seat cart 152 of one embodiment of the present invention from the top 154, side 156, and aft end 158. The seat cart of this embodiment is an all-welded assembly with a platform 160, typically disposed horizontally for supporting the weight of a seat assembly. Pads 162, 163, 164, 165 are affixed to the top surface 154 of the platform 160 upon which the legs of a seat assembly may rest. The pads are typically formed of aluminum and covered with rubber or other elastomeric materials. The pads 162, 163, 164, 165 may be pliant enough for a seat assembly to sink into and grip the pads 162, 163, 164, 165 so the seat assembly is secure on the seat cart 152. The pads 162, 163, 164, 165 may be replaced with sliding trays (not shown) to accommodate different seat leg widths. Bumpers may also be affixed to the sides 156 or end 180 of the seat cart 152. Bumpers may be separate attachments, as on the side 168 between pads 164, 165. Bumpers may be integral with respective pads 162, 163, 164, 165 and wrap around the sides of the seat cart 152. A handle 174 may be attached to an end, typically the aft end 158, of the seat cart 152 for handling of the seat cart 152. Bumper wheels 176, 178 may also be mounted to the sides and at the corners of the platform 160, as shown in FIG. 4 mounted at either side of the fore end 180 of the seat cart 152. In addition to providing bumpers at the forward corners of the seat cart assembly, these wheels 176, 178 may be rotatably mounted to the platform and used in conjunction with the handle 174 to transport an empty seat cart 152 on its edge.

The design of a seat cart 152 may include a hump 182 extending upwardly from the top surface 154 of the seat cart 152 across the width of the platform 160. The pads 162, 163, 164, 165 may be set on spacers such that the surface of the pads is level with the top of the hump 182. Thus, the height of the pads 162, 163, 164, 165 may be adjusted relative to the surface of the platform 154 by the use of spacers, not shown. A seat cart 152 of one embodiment of the present invention may support a seat assembly approximately eight to ten inches off the ground. This height is due primarily to the fact that the wheels must be large enough to effectively negotiate uneven floors or floors cluttered with obstacles, although, a seat cart may be designed with a lower platform height. Including a hump 182 in the top surface 154 of the platform 160 provides transverse stiffness to the platform 160, but also allows the casters 184, 185, 186 to be recessed in the bottom 192 of the seat cart 152, thereby reducing the overall height above the ground on which a seat assembly will rest, and, thus, the overall height of the seat gantry 30 may be reduced to facilitate the use of the seat gantry 30 in an area with restricted overhead space. A depression or downward hump may also be included to provide transverse stiffness to the platform 160 and allow for additional space below a seat assembly for electronics mounted beneath a seat assembly.

FIG. 5 is a perspective view of a seat cart 152 of one embodiment of the present invention from the bottom 192, side 194, and forward end 180. In FIG. 5, the positioning of bumper wheels 176, 178 at the corner of the sides 156, 194 and the fore end 180 of a seat cart 152 may be seen. Additionally, positions for attaching the casters 184, 185, 186 to the seat cart 152 may be seen. The design of the embodiment shown in FIG. 5 is a tricycle approach with two casters 184, 185 mounted in the hump recess just behind and towards the aft end 158 of the longitudinal center of gravity of the seat cart 152. A single caster 186 is affixed toward the fore end 180 of the seat cart 152. This design allows the seat cart 152 to be rotated about the two approximately central casters 184, 185 to allow a seat cart 152 to navigate obstacles as shown in FIGS. 6A, 6B, and 6C. The position of the casters 184, 185, 186 also allows the seat cart 152 to have a turning radius within the footprint of the seat cart. The construction and wheels of a seat cart may be designed to prevent the load on the floor from exceeding a predefined limit, such as 250 psi (lbs/in$^2$). A seat cart may be designed with additional wheels to distribute the weight of the load being carried by the seat cart over a larger area to reduce the localized load on the floor of the vehicle in which the seat cart is transporting a seat assembly.

The design of the seat cart 152 shown in FIGS. 4 and 5 allows one person to easily position the seat cart 152 under a heavy seat assembly while the seat assembly is suspended from a seat gantry frame by a hoist. Designing seat handling units to be operable by a single or limited number of individuals, where practicable, is desirable.

FIGS. 6A, 6B, and 6C are diagrams of a seat cart 152 of one embodiment of the present invention negotiating an obstacle. With a combined longitudinal center of gravity of the seat assembly and seat cart positioned just forward of the approximately central casters 184, 185, the aft end 158 of a seat cart 152 may rotate on the approximately centrally located casters 184, 185, allowing the fore end 180 of the seat cart 152 to raise high enough to navigate an obstacle 198. A forward and upward force 196 at the fore end 180 and/or downward and forward force 195 applied at the aft end 158 of the load will allow the seat cart to partially translate above an obstacle. Once the fore end caster 186 has cleared the obstacle 198 and the seat cart 152 is translated forward to a position where the approximately centrally located casters 184, 185 are resting against the obstacle 198, forward and downward force 199 at the fore end 180 and/or upward and forward force 197 applied at the aft end 158 of the load will allow the seat cart to proceed over the obstacle. This procedure allows a fully loaded seat cart to navigate or climb an obstacle. A fourth caster may be added to have two casters in the fore end of the seat cart and two casters located just behind the center of gravity of the seat cart. One advantage of adding a fourth wheel, or more wheels, is to reduce the localized load on the floor over which a seat assembly is being transported. As seat assemblies increase in weight, a four-wheeled seat cart design may be beneficial to avoid exerting pressures that exceed the load limit on a vehicle floor.

FIG. 7 is a perspective view of a first embodiment of an inside seat gantry 200 of the present invention. An inside seat gantry may be similar to an outside seat gantry, but may be designed for use in more confined spaces, particularly designed with a more compacted frame. Thus, after the seat assembly has been transported into the interior of the vehicle while onboard the seat cart, the seat assembly may be engaged by the inside seat gantry which removes the seat assembly from the seat cart and transports and positions the seat assembly to the proper location within the vehicle which may have only limited overhead space as shown in FIG. 1.

The frame of the inside seat assembly may be sized to accommodate the seat back height and seat width of different seat assemblies. An inside gantry frame may have two leg segments 202, 204 each with two or more tubes 206, 208, 210, 212 attached by tube cross-sections 214, 215, 216, 218, 219, 220. Typically, the tubes and cross-sections may be formed of aluminum, although they may be constructed of other materials if desired. The inside gantry frame includes an upper portion that includes a set of outer tubes 224, 226 and locking collets 230, 232, 234, 236 that may connect the leg segments 202, 204. In the illustrated embodiment, the legs 206, 208, 210, 212 have transitions 240, 242, 244, 246 from vertical to horizontal at the upper ends of the legs for increased frame stiffness and connecting the leg segments 202, 204 to the outer tubes 224, 226 and locking collets 230, 232, 234, 236 that allow the width 250 between the leg segments 202, 204 to be adjusted to accommodate different seat assemblies.

An inside seat gantry 200 may be equipped with multiple casters 255, 256, 257, 258 at the bottom end of the leg segments to provide for movement of the inside seat gantry 200. The manner and design in which the casters are affixed to an inside seat gantry frame may accommodate movement of an inside seat gantry 200 between narrow airplane aisles. As for seat carts, the pressure exerted by an inside seat gantry, alone or with a suspended seat assembly, may be designed not to exceed the load limit of a vehicle floor.

In some instances it may be desirable to further reduce floor load that is applied by the type of caster used on a seat gantry. In such an instance, a seat gantry may also be equipped with jack pads to distribute the weight of a suspended seat assembly across a larger surface area than can be provided by casters. The jack pads could be made to fold or retract against the gantry frame when not in use. Alternately, the casters could be affixed to the seat gantry in such a way that as a seat assembly is lifted the casters compress to permit the jack pads to contact the floor, such as by using spring loaded casters with suspension springs. Jack pads may be incorporated as part of the various types of casters that are used with a seat gantry of the present invention.

An inside seat gantry 200 may include a hoist 260 mounted on the upper portion of the frame. The hoist 260 may be mounted in such a way as to allow the hoist 260 to slide along the outer tubes 224, 226 of the frame on bearings 270, 271, 272, 273, typically formed of plastic. The hoist 260 may be held by hoist mounts 276, 277 resting upon spacers 278, 279 which are connected to cross beams 274, 275 generally positioned perpendicular to the hoist mounts 276, 277 and the hoist 260. The bearings 270, 271, 272, 273 fit within the distal ends of the cross beams 274, 275 to allow the hoist mount assembly to slide along the outer tubes 224, 226.

A hoist used with an inside seat gantry may be a variable speed, electric strap hoist. Due to the construction of a vehicle cabin, such as aircraft flooring or accessory panels and cabin walls, the hoist for an inside seat gantry may need the capability of variable speed to allow for a precision lifting and lowering of a seat assembly. For example, when lowering a seat assembly for installation, increased control may be needed near the floor to prevent buttons on the bottom of the seat assembly legs from damaging or penetrating the floor of the aircraft when attempting to install the buttons into seat tracks. The precision lifting capabilities of an inside seat gantry are also particularly beneficial in situations such as where seat buttons are not adjusted properly and, therefore, a seat assembly will not lock into the tracks. Thus, the inside seat gantry would be able to suspend the seat assembly just above an installation position to allow for the seat buttons to be checked by an operator, and adjusted if necessary, and easily reinstalled into the tracks. A similar situation occurs when installing a seat assembly with multiple seat legs that all must be carefully and simultaneously aligned for installation. An inside seat gantry with a variable speed hoist allows even the heaviest seat assemblies to be suspended just above the seat tracks to allow for easy alignment and installation of the seat assembly. Other types of hoists may be used with an inside seat gantry, such as a hand crank hoist.

A strap rather than a chain may be used with an inside seat gantry hoist to provide additional precision in the lifting controls, although any type of lifting connector may be used, including, but not limited to, a cable, linked tracking, or rope. A variable speed, electric strap hoist may use a DC motor used with an AC to DC rectifier to obtain variable speed. Alternatively, a variable speed, electric strap hoist may be a hybrid 120 volt alternating current (AC) hoist that allows for variable speed. The drum to receive a cable may be converted to accept a strap. This type of hybrid hoist may provide 0–11 feet per minute lifting capability at a 1,000 pound rating. Alternate power sources may be used to operate a hoist instead of electricity; however, different power sources may require adjustments to achieve a variable speed hoist for the present invention, such as to accommodate for different torque curves between electric and pneumatic motors.

The hoist 260 may be operated from a control, such as with a pendant control 280 connected to the inside seat gantry 200 by a connecting cable 282 that allows an operator to use the hoist 260 from any position around the inside seat gantry 200. The flexibility of using a pendant control 280 allows a single operator or a limited number of operators to perform the functions of lifting, maneuvering, transporting, and lowering a seat assembly while the individual controlling the hoist may also be able to see better or physically assist in the use of the inside seat gantry while operating the hoist 260. The hoist 260 may alternately be operated remotely without a physical connection, such as via wireless communication.

FIG. 8 is a perspective view of a second embodiment of an inside seat gantry 300 of the present invention. In this embodiment, the casters 305, 306, 307, 308 have been affixed to the inside seat gantry frame in such a manner as to increase the width 308 of the wheel base while maintaining the ability to easily navigate the inside seat gantry through narrow aisles and passageways. By increasing the width 308 of the wheel base, the inside seat gantry 300 has improved stability for more easily handling seat assemblies and moving the inside seat gantry 300 while a seat assembly is suspended from the hoist. The casters 305, 306, 307, 308 may be attached to base members 310, 312 that may be aluminum box sections. The base members 310, 312 may be rotatably connected to the bottom ends 314, 316 of the leg segments of an inside seat gantry frame. Alternatively, a base member may have an adjustable width such as caster mounts that retract inboard to decrease the wheel base for moving the inside seat gantry down a narrow aisle, such as by using different size box sections that may slide within each other. If a base member is rotatably connected to the end of the leg section of the frame, a locking mechanism may be used to maintain different positions for the wheel base such as an angular position to provide the widest possible wheel base or an angular position to allow for a narrower wheel base during movement of the inside seat gantry through a narrow aisle.

A seat gantry designed with features for operation as an outside seat gantry and for operation as an inside seat gantry may properly function in either situation. Thus, references to an outside seat gantry and an inside seat gantry may not be mutually exclusive but may be inclusive of a seat gantry with features that make capable operation in the given situation. However, for purposes of describing the system and method of handling seats of the present invention, seat gantries named as outside and inside seat gantries are used to further distinguish an action or purpose of a seat gantry performing the operations of the named seat gantry.

FIG. 9 is a perspective view of an inside seat gantry 330 of one embodiment of the present invention lifting a seat assembly 120. The illustration shows a seat assembly 120 with three seats 122, 124, 126 in the grouping elevated by the inside seat gantry 330 after having been lifted from a seat cart. The seat assembly 120 is supported by artificial lifting torsos 130, 132, described more fully herein with relation to FIGS. 12, 13 and 14, and a horizontal lifting beam 140, described more fully herein with relation to FIGS. 15A and 15B. The inside seat gantry of FIG. 9 may be designed with a frame height just great enough to lift a seat assembly from a seat cart while allowing a maximum amount of overhead space between the top of the inside seat gantry and overhead stow bins and accessory panels of an aircraft or other vehicle.

FIG. 10 is a perspective view of a third embodiment of an inside seat gantry 350 of the present invention with adjustable leg lengths and frame height and a hoist 360 mounted to a leg segment 352. To lower the center of gravity of the inside seat gantry 350, the weight of the hoist 360 has been shifted from a mounting location on the upper portion of the frame to a lower side mount. The hoist 360 has been modified to provide a more compact package to allow the hoist 360 to be mounted between the two legs 354, 356 rather than the elongated space 358 defined by the upper portion of the frame. This also increases the height the seat gantry can lift a seat assembly without increasing the overall height of the seat gantry. To provide such a compact hoist package, the hoist 360 has been modified from an in-line configuration to having a parallel gear drive configuration, for example where the motor 362 is mounted parallel to the strap drum 364 with a perpendicular gear drive 366 between the motor 362 and the strap drum 364. This allows the hoist 360 to be effectively folded to fit between the leg segments 354, 356 of the frames for mounting on a lower position just above the wheelbase. If relocating the hoist 360 from the top of the inside gantry frame to the side, the strap 370 may be routed with guides 372, 374, 376 from the location of the hoist to a position on the cross members of the frame.

Also shown in the embodiment of the present invention for an inside gantry 350 in FIG. 10, is the functionality of having variable leg lengths. The height of an inside gantry may need to be reduced for an installation location with a low overhead space, such as under the outboard stow bins on a 747 upper deck where the headroom is about 61 inches, or heightened for flexible use of an inside seat gantry in different situations, such as those having more overhead space. The leg segments 350, 352 may be designed with either removable or adjustable leg portions 380, 382 to adapt the inside seat gantry for an overall height to accommodate seat backs as high as 47 inches on a nine inch high seat cart and then installing the seat assemblies in positions with reduced overhead space. One procedure for accomplishing this type of installation would be to remove a seat assembly from a seat cart in the middle of an aisle where an inside seat gantry may be at a heightened position, removing the seat cart from beneath assembly, lowering the seat assembly onto the floor possibly protected by a material to avoid damage to the floor by seat buttons, lowering the height of the seat gantry to a position low enough to fit beneath the overhead bins and accessory panels for the location of installation and high enough to again lift the seat assembly from the position on the floor, moving the seat assembly suspended from the inside seat gantry into position for installation, and lowering the seat assembly for installation. This type of procedure could be simplified by designing the seat gantry with adjustable leg sections that may lengthen or reduce while a seat assembly load is suspended from the inside seat gantry; a hydraulic or pneumatic ram or a mechanical gear drive, such as a beveled screw gear, may be used to allow the seat gantry this type of adjustment.

FIG. 11 is a schematic diagram of one embodiment of an upper portion of an inside seat gantry of the present invention. The tube sections 400, 402 from the leg segments 405, 406, 407, 408, after having curved or transition such as to a horizontal orientation, may pass through collet assemblies 420, 422, 424, 426 with collet nuts 430, 432, 434, 436 and collets 440, 442, 444, 446 that allow for width adjustment of the legs 400, 402 using larger diameter tube sections 450, 452 between collet assemblies 420, 422, 424, 426 on either end of the leg segments 400, 402 of the gantry frame. In the embodiment of FIG. 11, one tube section 400 is fixed while the other tube section 402 extends and/or retracts to provide width adjustment, but both tube section 400, 402 could be made to extend or retract. Bushings 445, 447 are pressed onto the distal ends of leg segments 407, 408 after the collet assemblies 424, 426 are slipped over the horizontal portions of the leg segments 407, 408. Bushings 445, 447 serve as spacers to occupy the difference between the outside diameter of the tubes that make up leg segments 407, 408 and the inside diameter of tube segments 450, 452. Thus, the distal ends of the horizontal portions of leg segments 407, 408 are held centered and stable as they slide within tube segments 450, 452 to allow tube section 402 to extend and/or retract for width adjustments. This telescoping action may also be accomplished using tubes matched for inside and outside diameters if appropriate provisions are made, including provisions for stiffness, load carrying, and position locking. Typically, the collet assemblies, collets, and bushings are plastic and the collet nuts and the larger diameter tube sections are aluminum, although different materials may be utilized. Also shown in FIG. 11, is one embodiment of an in-line hoist mount that may slide along the larger diameter tube sections 450, 452. Bearings 460, 462, 464, 466, typically formed of plastic and perpendicular cross beams 470, 472 are used with spacers 476, 478 and hoist mounts 480, 482 to provide a fixed structure that may slide the hoist along the tube sections 450, 452.

FIG. 12A is an exploded, perspective view of the structure of a first embodiment of an artificial lifting torso of the present invention. FIG. 12B is a perspective view of a first embodiment of an artificial lifting torso of the present invention. To take advantage of seat belts for a common lifting point, artificial lifting torsos may be secured with a seat belt on a seat assembly while also providing a level attitude for the seat assembly. Because of different locations of fore-aft centers of gravity of different seat assemblies, an artificial lifting torso or dummy lap with multiple lifting points may be used to allow a seat gantry to lift a variety of seat assemblies while maintaining a level attitude of the seat assembly. An artificial lifting torso 500 may be constructed from an armature 508 with a lifting spine 502 that has multiple lifting points 503, 504, 505, 506 incorporated to allow for different centers of gravity. This armature 508 may be formed of aluminum or other materials and covered with high-density foam 510 and coated with a polyester resin for durability. The armature shown in FIG. 12 incorporates a lifting spine 502 at the upper end of the back portion of the artificial lifting torso 500.

The design of the lifting torso may incorporate a surface 512, typically designed to have a horizontal orientation, to exert a longitudinal and angular force on the seat portion of a seat assembly and a back portion 514 to exert a horizontal and angular force on the back portion of a seat assembly. The horizontal seat portion and vertical back portion are intended to transfer torque forces, resulting from the tendency of a seat to rotate forward or aft as it is lifted, depending on the center of gravity and weight distribution, to the seat pan and seat back. Multiple lifting points on a lifting spine are intended to allow an artificial lifting torso to be used with a variety of seat assemblies with different fore-aft centers of gravity and seat depth and pitch. FIG. 12B shows an angle at the intersection of the seat portion 512 and the back portion 514. This angled segment, or lap portion 515, is intended to accept a seat belt if a seat belt is used to secure the artificial lifting torso to the seat assembly. The appropriate lifting point may be selected so a seat assembly is lifted with level attitude. Two artificial lifting torsos may be used in combination with a balance beam for a seat assembly with multiple seats as shown in FIGS. 3 and 9. Typically, the artificial lifting torsos are secured within the outermost seats, as shown in those figures. The combination is intended to provide a side-to-side level attitude of the seat assembly with a central pick point for the hoist.

FIG. 13 is a cross-sectional view of a first embodiment of an artificial lifting torso 500 of the present invention. This view shows the angle of one embodiment of a lap portion 515 at the intersection of the back portion 514 and seat portion 512 of the artificial lifting torso 500.

FIG. 14 is a perspective view of a second embodiment of an artificial lifting torso 520 of the present invention. Due to the locations of some seat assembly centers of gravity being located forward of a lifting spine on a seat assembly such as in the embodiment shown in FIGS. 12A, 12B, and 13, a lifting tang 522 that extends forward from the armature 524 may be included in the artificial lifting torso 520, causing a torque moment that forces the rear upper end 526 of the vertical back portion of the artificial lifting torso 520 into the seat back. The back of the armature 524 may also be extended upward to counterbalance the torque moment of an extending lifting tang 522. An all aluminum artificial lifting torso 520 may be constructed in part to decrease the increased weight from modifications to counterbalance the affects of a forward lifting tang 522. However, the artificial lifting torso may be constructed from other materials, if desired, such as aluminum alloy or a carbon fiber composite. An artificial lifting torso may also be designed with a hinged waist (not shown) to better fit the angle between the seat back and seat pan of different seat assemblies.

The embodiment an artificial lifting torso 520 shown in FIG. 14 includes a formed lap portion 530. In one embodiment, the lap portion has an approximately eight-inch radius across the width of the artificial lifting torso 520. The lap portion 530 is intended to transition the vertical to horizontal intersection of the back portion 532 and seat portion 534 of an artificial lifting torso 520 and accept and orient a seat belt to secure the artificial lifting torso 520 to a seat assembly. The formed lap portion 530 may be attached to a lever or otherwise actuated ratcheting mechanism, not shown, that pushes the lap portion 530 out, away from the seat and back pan junction, thereby producing a tensioning force on a seat belt secured across the lap portion 530. Use of a belt tensioning mechanism insures that seat belts will have consistent tension prior to applying the seat weight as the seat assembly is hoisted.

FIG. 15A is a schematic diagram of a first 600 embodiment of a lifting balance beam of the present invention. FIG. 15B is a schematic diagram of a second 650 embodiment of a lifting balance beam of the present invention. A lifting balance beam may have a plurality of downward and upward lifting points that may be used to accommodate the side-to-side center of gravity for a variety of seat assembly configurations. Upward lifting points may attach a lifting beam to a hoist, and downward lifting points may attach a lifting beam to an artificial lifting torso. A short balance beam 600 may be used for double seat assemblies. A longitudinal lifting section 602 may be strengthened with a T-weld to a horizontal support section 602. A T-shaped design may be used to provide longitudinal stiffness along the length of the other beam while preserving a lightweight balance beam. The longitudinal section 600 will have multiple upward lifting points 606 along its central and top section and multiple downward lifting points 608, 610 at either distal end of the longitudinal section. A larger balance beam 650 may be used for seat assemblies with three seats. A longer beam 650 may be a hollow sandwich assembly designed to support the heavier seat assemblies. A hollow sandwich design may include two longitudinal and vertical sections 652, 654 with an additional upward lifting point tang 656 connected therebetween. The two elongated sections 652, 654 may have multiple downward lifting points 658, 659 for a variety of seat assemblies. Lifting beams may be made from aluminum, however, other materials may be utilized. Other designs may be used to achieve similar strength and stiffness for a balance beam such as an "I" or "sandwich" cross-section beam or a box section beam. A balance beam may also be configured and designed to extend or retract as needed. When designing the length of a balance beam, the outboard distance between the center of gravity of a seat assembly and the cabin wall may need to be taken into consideration to prevent use of a longer balance beam when a shorter beam will do and will not overhang the ends of the seat assembly. Typically a short balance beam is used on seat assemblies with two seats side by side while the longer balance beam is used on seat assemblies with three or more adjacent seats. If the ends of the balance beam overhang the seat ends, there is a chance that the sidewall of the vehicles cabin may be damaged. Outside the vehicle, a longer beam is typically used since it may be constructed with multiple lifting positions that will accommodate many different seat widths.

FIG. 16 is a perspective view of an embodiment of an inside seat gantry 700 of the present invention that may be used to install seat assemblies against a bulkhead. In this embodiment a "C" frame is created to lift and lower a seat gantry for installation where a second leg segment is prohibitive due to the installation position on an aircraft. In this embodiment a leg segment 704 is mounted on a base assembly consisting of two metal tangs 706, 708, typically made from aluminum, although other materials could be used that meet stress requirements to support the expected weight of a seat gantry. The metal tangs 706, 708 may be flat plates with a tapered thickness that is greatest nearest the connecting bar 710 and tapers to about half the starting thickness at the distal ends. The tangs 706, 708 are designed to extend under a seat assembly to a point just aft of the fore and aft center of gravity of a seat assembly. The width 712 between the tangs 706, 708 may be variable using telescoping segments 714, 716 nested inside a connecting segment 718. The leg segment 704 may plug onto the connecting bar 710 by means of studs 720, 722 attached to the connecting bar 710. The connection between the leg segment 704 and the connecting bar 710 may be temporary so the connection can be disassembled to aid removal of the seat gantry 700 once the seat has been installed.

The leg segment 704 has two tubes 724, 726, sized for the expected loads, extending vertically and joined by tube cross sections 728, 730 and a hoist mount 732. In the illustrated embodiment the leg tubes 724, 726 have transitions 734, 738 from vertical to horizontal. The horizontal elements 740, 742 are cantilevered out from the vertical elements 724, 726 to a point past the typical fore and aft center of gravity point of a seat assembly.

In the embodiment shown in FIG. 16, a hand crank strap hoist 744 is mounted on the hoist mounting plate 732. The strap 746 extends up from the hoist 744 and makes a ninety-degree twist at a turning pulley 748. The strap 746 transitions to a horizontal position between the leg tubes through a turning pulley 749 and then out to a snatch block 750 where the strap turns down to pick up a balance beam carrying the seat assembly. This is similar to the embodiment shown in FIG. 10. The snatch block 750 and strap 746 are supported by bearings 752, 754 and a channel 756. The channel 756 permits the position of the snatch block 750 to be varied fore and aft.

The inside seat gantry embodiment 700 may be required for situations in which a seat back must be positioned and installed flush against a rear bulkhead or cabin divider. In this case an embodiment such as the inside gantry 200 shown in FIG. 7 may not be ideal because a rear leg segment may not be able to be cleared from behind a seat assembly after the seat assembly is installed. A seat gantry embodiment similar to the embodiment of a seat gantry 700 shown in FIG. 16 may be used to lift a seat assembly from a seat cart and lower the seat assembly to the vehicle floor if the seat back must be placed flush against a rear bulkhead and/or cabin divider that cannot be installed after the seat is positioned or has already been installed. A seat assembly cannot be transported on the seat gantry embodiment 700 illustrated in FIG. 16; however, if there is clearance under the seat assembly, the base of the seat gantry 700 may be modified to accommodate casters, rollers, air sleds, or other suitable means of providing for the movement of the assembly.

For installation, a seat gantry, typically an outside seat gantry, lifts a seat assembly from shipping materials, such as a shipping platform or pallet. The seat gantry may be used to move the suspended seat assembly for lowering onto a seat cart, if necessary, and lowers the seat assembly onto a seat cart. A seat cart may be used to transport a seat assembly from a location outside a vehicle into a vehicle cabin, such as from a warehouse floor into an aircraft passenger cabin. A seat gantry, typically an inside seat gantry, lifts the seat assembly from the seat cart, if necessary, transports the seat assembly over an installation location, and lowers the seat assembly for installation. During this process, artificial lifting torsos and lifting beams may be used with multiple seat assemblies to maintain balanced attitude of the seat assembly. For removal of a seat assembly, the above process is reversed. For repair or maintenance, a seat gantry may lift a seat assembly from an installed position. If necessary, the seat gantry may move the seat assembly or the seat gantry may lower the seat assembly onto a seat cart for transport. After the repair, if necessary, the seat is transported back to the installation location, and the seat gantry lowers the seat assembly over the installation location.

Many modifications and other embodiments of the inventions set forth herein will come to mind to one skilled in the art to which these inventions pertain having the benefit of the teachings presented in the foregoing descriptions and the associated drawings. For example, the inside and outside seat gantries are described to be partially constructed of tubes or tube sections. However, these tubes may be hollow or solid and may have any desired cross-sectional shape. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A seat gantry system for handling seat assemblies, comprising:
   a first seat gantry for lifting a passenger seat assembly with at least one seat engagement mechanism; and
   a seat cart capable of being disposed under the passenger seat assembly while in a lifted position by said first seat gantry and for receiving the passenger seat assembly from said first seat gantry, wherein said at least one seat engagement mechanism is an artificial lifting torso secured to the seat assembly and providing at least one balanced lifting point for said first seat gantry.

2. The system of claim 1, comprising at least two artificial lifting torsos and further comprising a load balance beam disposed between said artificial lifting torsos and said first seat gantry for lifting the seat assembly.

3. The system of claim 2, wherein said load balance beam includes at least one upward lifting point for connection to said first seat gantry and at least two downward lifting points for connection to said artificial lifting torsos.

4. The system of claim 1, wherein said first seat gantry comprises at least two base members with opposing distal ends and to which casters are affixed for providing lateral movement of said first seat gantry through rotation of said casters.

5. The system of claim 4, wherein said base members are rotatably mounted to said first seat gantry to permit adjustment of the width of said first seat gantry for operation inside a confined space of a vehicle cabin.

6. The system of a claim 1, further comprising a hoist mounted to an overhead frame of the first seat gantry, wherein the hoist is operably engaged with and capable of lifting and lowering the seat assembly from said at least one seat engagement mechanism.

7. The system of claim 6 further comprising a control pendant interoperably connected to said hoist.

8. The system of claim 6, wherein said hoist is a variable speed hoist.

9. A seat gantry system for handling seat assemblies, comprising:
   a first seat gantry for lifting a passenger seat assembly with at least one seat engagement mechanism;
   a seat cart capable of being disposed under the passenger seat assembly while in a lifted position by said first seat gantry and for receiving the passenger seat assembly from said first seat gantry; and
   a second seat gantry for lifting the passenger seat assembly from and to said seat cart with said at least one seat engagement mechanism and designed for operation inside a confined space of a vehicle cabin, wherein said second seat gantry is independently moveable with respect to the vehicle cabin,
   wherein said at least one seat engagement mechanism is an artificial lifting torso secured to the seat assembly and providing at least one balanced lifting point for said first seat gantry.

10. The system of claim 9, further comprising:
    at least two artificial lifting torsos; and
    a load balance beam disposed between said artificial lifting torsos and said first seat gantry for lifting the seat assembly.

11. The system of claim 10, wherein said load balance beam includes at least one upward lifting point for connection to said first seat gantry and at least two downward lifting points for connection to said artificial lifting torsos.

12. A seat gantry system for handling seat assemblies, comprising:
    a first seat gantry for lifting a passenger seat assembly with at least one seat engagement mechanism;
    a seat cart capable of being disposed under the passenger seat assembly while in a lifted position by said first seat gantry and for receiving the passenger seat assembly from said first seat gantry; and
    a second seat gantry for lifting the passenger seat assembly from and to said seat cart with said at least one seat engagement mechanism and designed for operation inside a confined space of a vehicle cabin, wherein said second seat gantry is independently moveable with respect to the vehicle cabin,
    wherein said second seat gantry comprises at least two base members with opposing distal ends and to which casters are affixed for providing lateral movement of said second seat gantry through rotation of said casters.

13. The system of claim 12, wherein at least one of the first and second seat gantries is adapted to be vertically adjustable to accommodate lifting passenger seat assemblies of a plurality of heights.

14. The system of claim 12, wherein said base members are rotatably mounted to said second seat gantry to permit adjustment of the width of said second seat gantry for operation inside the confined space of the vehicle cabin.

* * * * *